US008487767B2

(12) United States Patent
Inano et al.

(10) Patent No.: US 8,487,767 B2
(45) Date of Patent: Jul. 16, 2013

(54) INFORMATION ACCESS SYSTEM, INFORMATION DEVICE, READER/WRITER AND RECORDING MEDIUM

(75) Inventors: Satoshi Inano, Kawasaki (JP); Isamu Yamada, Kawasaki (JP); Shinichi Shiotsu, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1210 days.

(21) Appl. No.: 12/338,312

(22) Filed: Dec. 18, 2008

(65) Prior Publication Data

US 2009/0153331 A1 Jun. 18, 2009

(30) Foreign Application Priority Data

Dec. 18, 2007 (JP) ................................. 2007-325781

(51) Int. Cl.
*G08B 13/14* (2006.01)
(52) U.S. Cl.
USPC ................ 340/572.1; 340/10.41; 340/539.13; 340/539.21
(58) Field of Classification Search
USPC ................. 340/10.1–10.6, 505, 572.1–572.9, 340/539.1, 539.13, 539.21, 539.23, 539.3
See application file for complete search history.

(56) References Cited

U.S. PATENT DOCUMENTS

| 6,922,402 | B1 | 7/2005 | Ko |
| 2006/0038684 | A1 * | 2/2006 | Lahiri ........................ 340/572.1 |
| 2006/0276206 | A1 | 12/2006 | Shiotsu et al. |
| 2007/0237087 | A1 | 10/2007 | Shimizu |

FOREIGN PATENT DOCUMENTS

| JP | 2000-90386 | 3/2000 |
| JP | 2000-113130 | 4/2000 |
| JP | 2001-187611 | 7/2001 |
| JP | 2001-251210 | 9/2001 |
| JP | 2005-87135 | 4/2005 |
| JP | 2006-127162 | 5/2006 |
| JP | 2006-243979 | 9/2006 |
| JP | 2006-338489 | 12/2006 |
| JP | 2007-72746 | 3/2007 |
| JP | 2007-280197 | 10/2007 |
| JP | 2007-288578 | 11/2007 |

OTHER PUBLICATIONS

Office Action issued by the Japanese Patent Office on May 22, 2012 in the corresponding Japanese patent application No. 2007-325781.

* cited by examiner

*Primary Examiner* — George Bugg
*Assistant Examiner* — Sharmin Akhter
(74) *Attorney, Agent, or Firm* — Staas & Halsey LLP

(57) ABSTRACT

An information access system including an information device that is adapted for radio communication with a reader/writer, the information device having a detection data acquisition unit acquiring detection data from a sensor, a detection data storage unit holding the most recent detection data, a first receiving unit detecting the reception of an RF signal, and a first transmission unit transmitting a response signal. The reader/writer is adapted for radio communication with the information device and includes a second transmission unit transmitting the information request signal, a second receiving unit receiving the response signal, an accumulation recording unit recording the received detection data, and a detection data accumulation unit accumulating, in the accumulation recording unit, the most recent detection data, and if other detection data has not been accumulated in the accumulation recording unit, accumulating the other detection data in the accumulation recording unit.

8 Claims, 28 Drawing Sheets

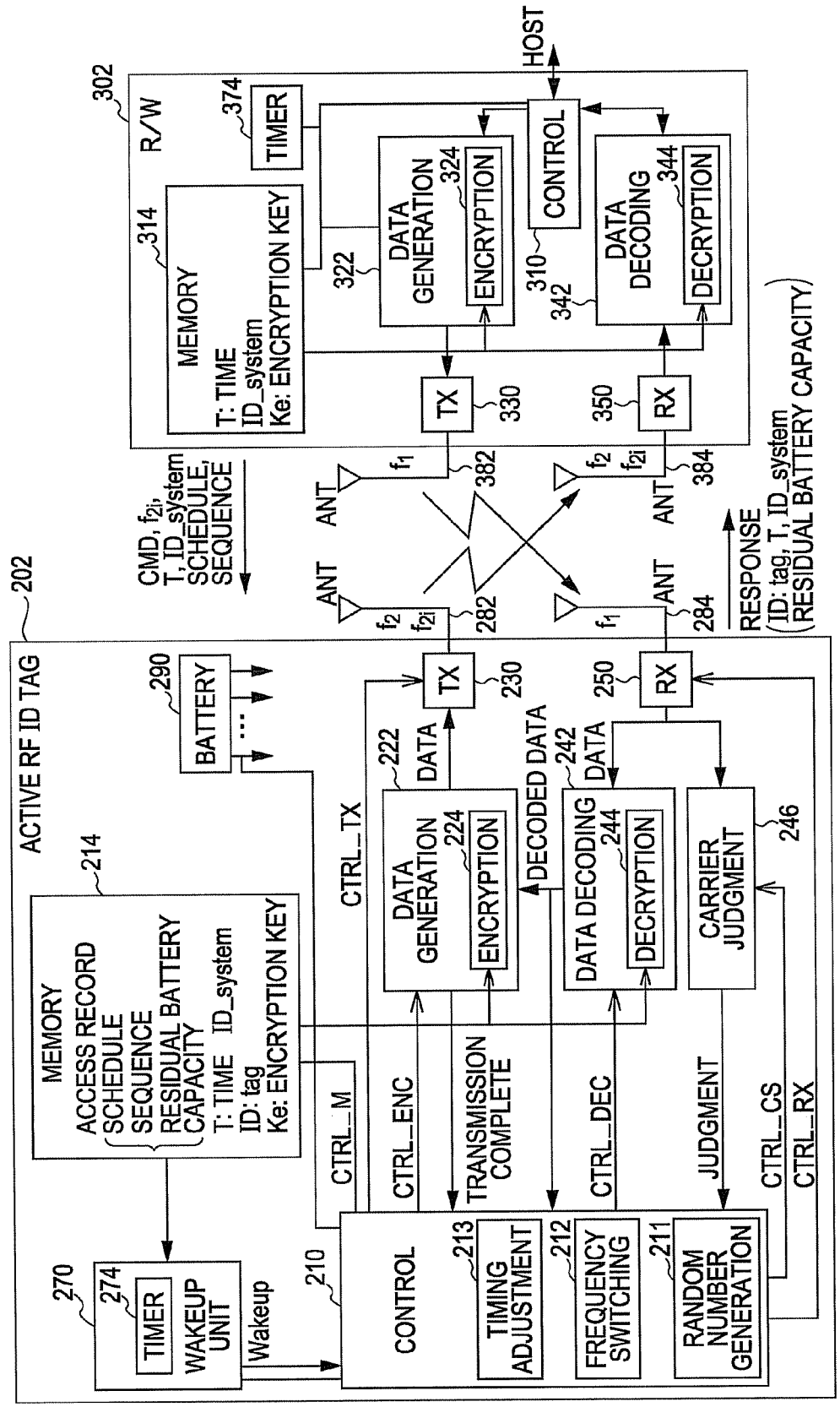

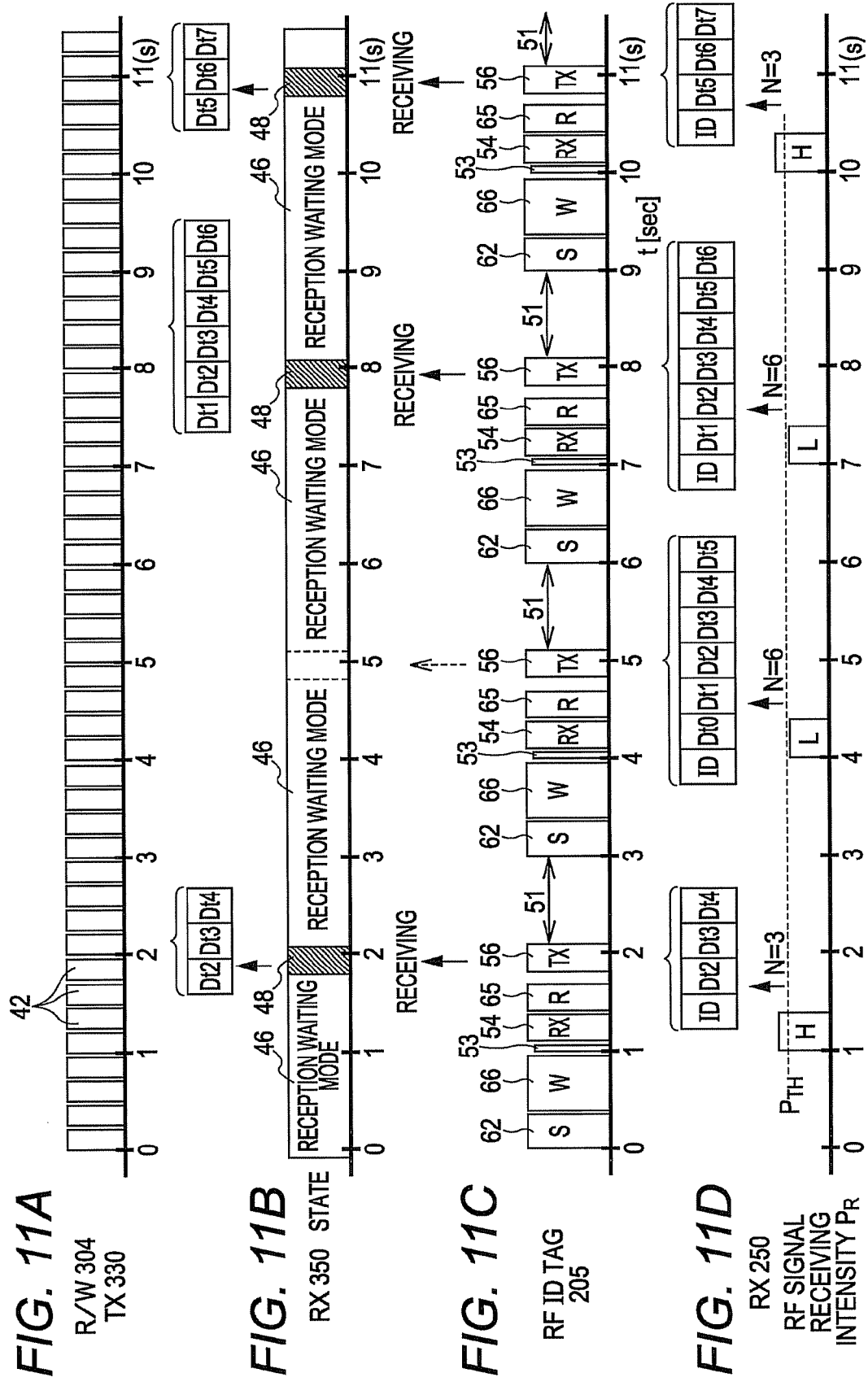

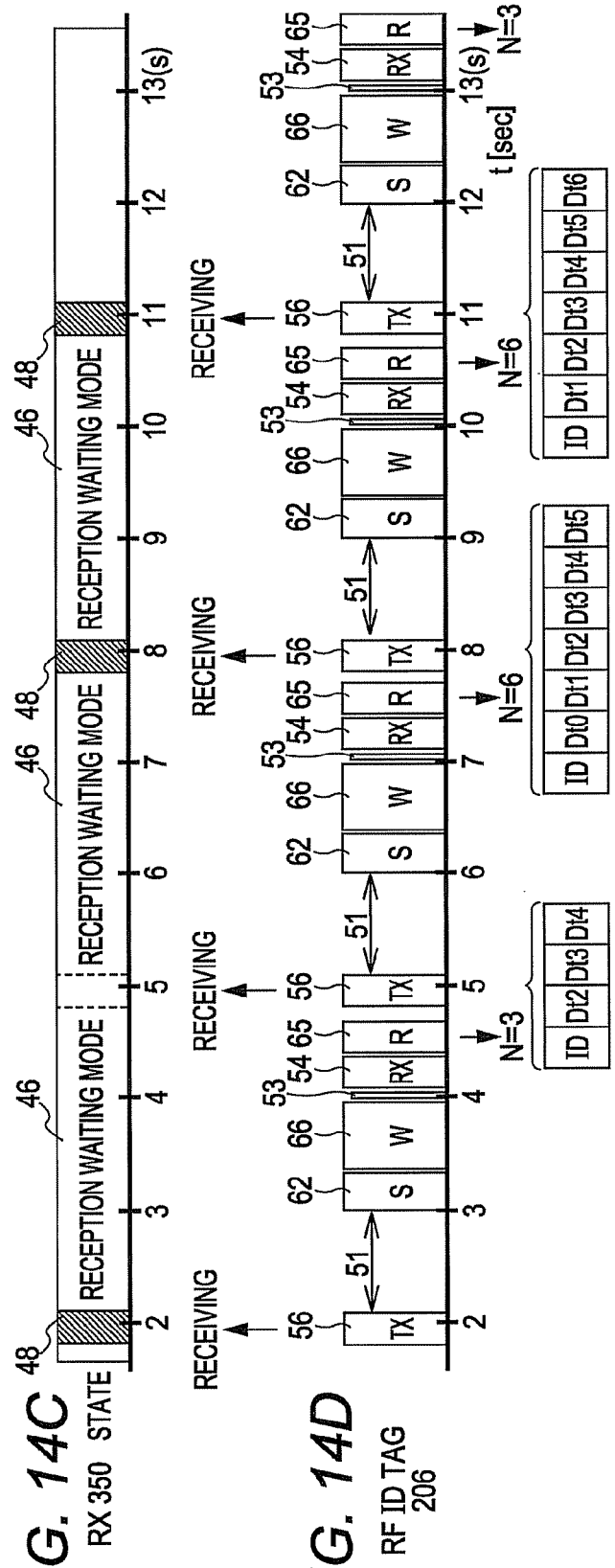
FIG. 14A R/W 305 TX 330
FIG. 14B RF SIGNAL RECEIVING INTENSITY $P_R$
FIG. 14C RX 350 STATE
FIG. 14D RF ID TAG 206

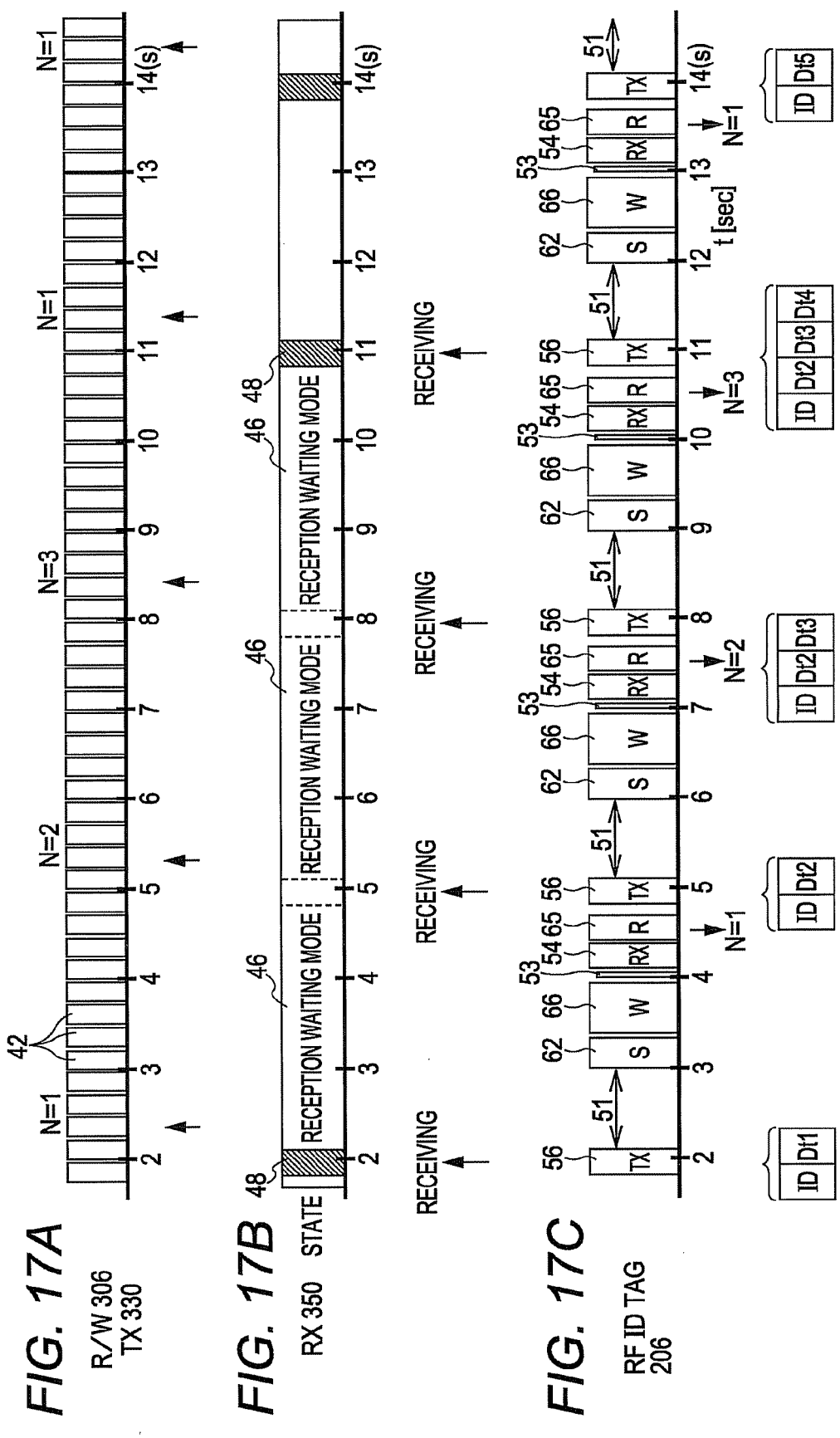

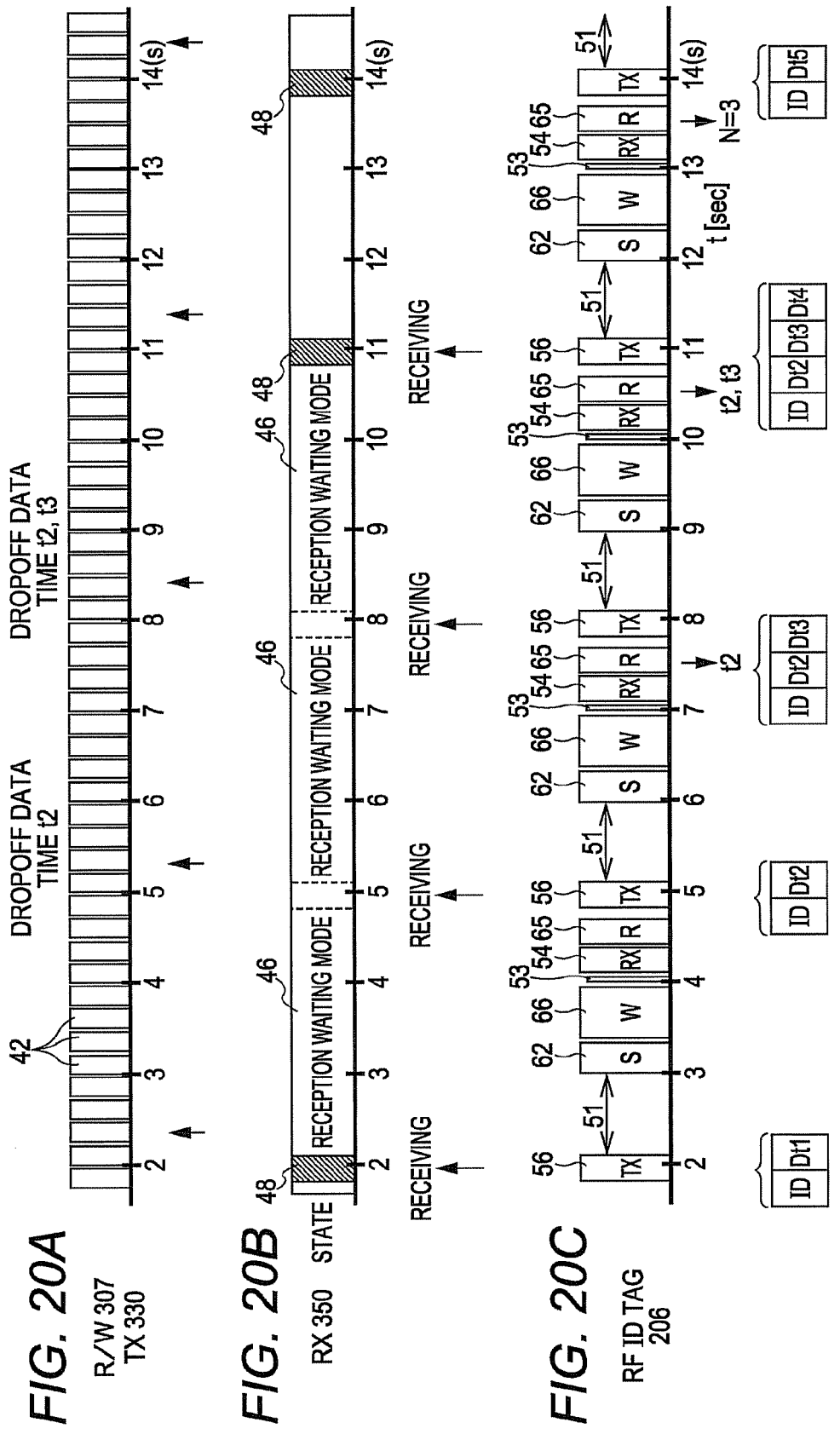

INFORMATION ACCESS SYSTEM, INFORMATION DEVICE, READER/WRITER AND RECORDING MEDIUM

CROSS-REFERENCE TO RELATED APPLICATIONS

This application is related to and claims priority under 35 U.S.C §119(a) on Japanese Patent Application No. 2007-325781 filed on Dec. 18, 2007 in the Japan Patent Office, and incorporated by reference herein.

BACKGROUND OF THE INVENTION

1. Field of the Invention

The present invention relates to a non-contact information device capable of reading and writing information in a non-contact manner, and in particular, to an RF-ID tag or a non-contact IC card having a sensor and accumulating the values detected by the sensor.

2. Description of the Related Art

A battery-fed RF-ID, i.e. an active RF-ID tag is mounted on a commodity or carried by a person to transmit a RF signal of a predetermined frequency carrying the ID and the information on the commodity or the person, as the case may be. The RF signal of the RF-ID tag is read by a reader. The information thus read is further processed by a computer or the like. In this way, the distribution of the commodity or the behavior of the person, as the case may be, can be monitored and managed. The battery-fed active RF-ID tag, as compared with the passive RF-ID tag for receiving the power from a reader/writer in a non-contact manner, has a comparatively long communicable distance and high practical value.

The RF-ID tag having a sensor for both detecting the physical quantity in the surrounding environment and accumulating the data of the detection values is read by the reader/writer, so that the detection value data can be collected together with the ID.

Japanese Patent Application Laid-Open No. 2000-113130 (A) dated Apr. 21, 2000 discusses an IC tag detection system of low power consumption. This system includes a communication circuit, a control unit, a power supply unit for supplying power to these parts from a battery, time counting means, plural IC tags set at predetermined different transmission timings, and a sensor for detecting the presence or absence of the respective IC tags based on the communication with them. The sensor has a communication circuit for judging and detecting the reception for each set time of the IC tags as required. In the absence of an inquiry from the sensor, the IC tag can avoid the wasteful reaction or battery power consumption.

Japanese Patent Application Laid-Open No. 2001-251210 (A) dated Sep. 14, 2001 discusses a method of realizing a frequency lock requiring no independent reference oscillators for the transmitters of two nodes in the duplex link. In the full duplex link, the carrier frequencies of the transmitters are tuned using the information of the receiving frequency to thereby lock the transmission frequencies of the two nodes in the link at the same time. The offset in the carrier frequency of the first transmitter is detected as a corresponding offset of the second receiver. The second receiver shifts the carrier frequency of the first transmitter in accordance with the detected offset and thus notifies the detected offset to the first transmitter. The carrier frequency of the first transmitter is corrected by the offset detected in the first receiver.

Japanese Patent Application Laid-Open No. 2001-187611 dated Jul. 10, 2001 discusses a temperature management system including a sensor unit having a temperature sensor in the ID tag. The CPU of the sensor unit writes in the EEPROM (Electrically Erasable Programmable Read Only Memory) the temperature measured by the temperature sensor at predetermined intervals of time. The temperature data written in the EEPROM can be read by an external reader/writer. This ID tag with a sensor, if mounted on a beer barrel, for example, makes it possible to detect the temperature change of the beer barrel before the beer is sold to customers in outlets such as restaurants after shipment from a beer brewery. In this way, the beer temperature can be managed sufficiently.

Japanese Patent Application Laid-Open No. 2005-87135 dated Apr. 7, 2005 discusses a food cooking history measurement method. This method uses an RF-ID having at least a temperature sensor, a timer and a RAM for recording, in time series, the values measured by the temperature sensor. With this RF-ID, the internal data of the food material measured in the cooking environment with the temperature sensor inserted therein is recorded in the RAM 14.

Japanese Patent Application Laid-Open No. 2006-127162 dated May 18, 2006 discusses a measurement data collection system, in which a measuring instrument transmits the measurement data to the IC tag by radio, and the IC tag that has received the measurement data stores the particular data. The IC tag reader transmits the data to the IC tag reader by radio either periodically or with the reception of a start signal from the gate as a motive. The user collects the measurement data in the measurement data collection server 4 on the network without wired connection.

SUMMARY OF THE INVENTION

According to various embodiments, an information access system includes an information device that is adapted for radio communication with a reader/writer, the information device including a detection data acquisition unit periodically acquiring detection data indicating a physical quantity or a state from a sensor detecting the physical quantity or the state, a detection data storage unit holding at least a predetermined number of the most recently acquired detection data acquired over a plurality of times by the detection data acquisition unit, a first receiving unit periodically detecting the reception of an RF signal transmitted from the reader/writer, and a first transmission unit transmitting a response signal carrying the predetermined number of the most recently acquired detection data in response to the reception of an information request signal by the receiving unit. The reader/writer is adapted for radio communication with the information device and includes a second transmission unit repeatedly transmitting the information request signal, a second receiving unit receiving the response signal carrying the predetermined number of the detection data, an accumulation recording unit recording the received detection data, and a detection data accumulation unit accumulating, in the accumulation recording unit, the most recently acquired detection data included in the predetermined number of received detection data, and if other detection data included in the predetermined number of the received detected data has not been accumulated in the accumulation recording unit, accumulating the other detection data in the accumulation recording unit.

BRIEF DESCRIPTION OF THE DRAWINGS

FIG. 1 illustrates an example of the configuration of an active RF-ID tag and a reader/writer as an active non-contact information storage unit;

FIG. 11A illustrates an example of the time chart of the transmission process of the RF signal carrying the tag information request command (CMD) of the reader/writer;

FIG. 11B illustrates an example of the time chart of the reception waiting mode and the receiving process of the RF signal of the reader/writer;

FIG. 11C illustrates an example of the time chart of the carrier sense period of the active RF-ID tag, the detection of physical quantities, the read and write operation of the detection value data from and into a memory, the receiving process of the RF signal, the read operation of the accumulated detection value data from the memory and the transmission process of the RF signal carrying the data containing the tag information such as the tag ID or the response data;

FIG. 11D illustrates an example of the receiving power level PR of the RF signal in the active RF-ID tag 205;

FIG. 14A illustrates an example of the time chart of the transmission process of the RF signal carrying the tag information request command (CMD) of the reader/writer;

FIG. 14B illustrates an example of the receiving power level of the RF signal in the reader/writer;

FIG. 14C illustrates an example of the time chart of the reception waiting mode and the receiving process of the RF signal of the reader/writer;

FIG. 14D illustrates an example of the time chart of the carrier sense period of the active RF-ID tag, the detection of physical quantities, the read and write operation of the detection value data from and into a memory, the receiving process of the RF signal, the read operation of the accumulated detection value data from the memory and the transmission process of the RF signal carrying the data containing the tag information such as the tag ID or the response data;

FIG. 17A illustrates an example of the time chart of the transmission process of the RF signal carrying the tag information request command (CMD) of the reader/writer;

FIG. 17B illustrates an example of the time chart of the reception waiting mode and the RF signal receiving process of the reader/writer;

FIG. 17C illustrates an example of the time chart of the carrier sense period of the active RF-ID tag, the detection of physical quantities, the read and write operation of the detection value data from and into a memory, the RF signal receiving process, the read operation of the accumulated detection value data from the memory and the transmission process of the RF signal carrying the data containing the tag information such as the tag ID or the response data;

FIG. 20A illustrates an example of the time chart of the transmission process of the RF signal carrying the tag information request command (CMD) of the reader/writer;

FIG. 20B illustrates an example of the time chart of the reception waiting mode and the RF signal receiving process of the reader/writer;

FIG. 20C illustrates an example of the time chart of the carrier sense period of the active RF-ID tag, the detection of physical quantities, the read and write operation of the detection value data from and into a memory, the RF signal receiving process, the read operation of the accumulated detection value data from the memory and the transmission process of the RF signal carrying the data containing the tag information such as the tag ID or the response data;

DETAILED DESCRIPTION OF THE EMBODIMENTS

Figure 2A:
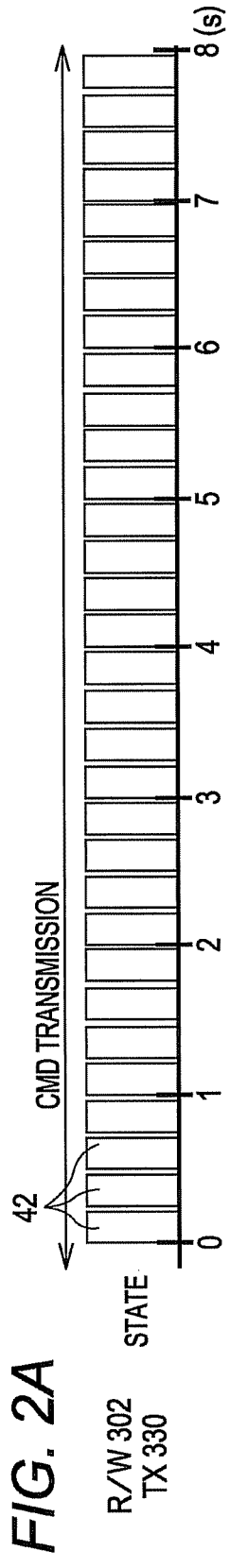
FIG. 2A illustrates an example of the time chart of the process of transmitting the RF signal carrying a tag information request command of the reader/writer.

Non-limiting embodiments of the invention will be explained below with reference to the drawings. In the drawings, similar component elements are designated by the same reference numerals, respectively.

FIG. 1 illustrates an example of the configuration of an active RF-ID tag 202 and a reader/writer 302 as an active non-contact information storage unit. A non-contact IC card including a similar configuration to the active RF-ID tag 202 may be used in place of the active RF-ID tag 202 as the active non-contact information storage unit. In this case, the transmission data is encrypted between the RF-ID tag 202 and the reader/writer 302, and the received data is decrypted and used for authentication. As a replacement configuration, the authentication may be done without and the transmission data may not be encrypted.

The active RF-ID tag 202 includes a control unit 210, a memory 214, a data generating unit 222, a transmission unit (TX) 230, a receiving unit (RX) 250, a data decoding unit 242, a carrier judging unit 246, a wakeup unit 270, a transmission antenna (ANT) 282, a receiving antenna (ANT) 284 and a battery 290.

The wakeup unit 270 includes a timer 274 for measuring and generating the time and always assumes an active state after the power of the RF-ID tag 202 is switched on. The wakeup unit 270 supplies a wakeup signal of a predetermined carrier sense period Tcs such as 2 seconds to the control unit 210 in accordance with the preset time on the timer 274 and the preset control schedule and the time control sequence read from the memory 214.

The data generating unit 222 includes an encryption unit 224 for encrypting the transmission data in accordance with a predetermined encryption scheme using an encryption key Ke stored in the memory 214. The data decoding unit 242 includes a decryption unit 244 for decrypting the received data using the encryption key/decryption key Ke in accordance with a predetermined encryption scheme. In the case under consideration, the predetermined encryption scheme is assumed to be the common key encryption scheme and may alternatively be a public key encryption scheme.

The data generating unit 222 generates the data of a predetermined format including the tag ID (ID_tag) stored in the memory 214, encrypts it in accordance with a predetermined encryption scheme, and generates the encoded data by encoding the encrypted data in accordance with the predetermined encoding scheme. This data may include an access record. The transmission unit (TX) 230 modulates the carrier with the baseband encoded data received from the data generating unit 222, and transmits the RF signals of frequency $f_2$ or different frequencies $f_{2i}$ (n=1, 2, ..., n).

The receiving unit (RX) 250 receives and demodulates the RF signal of frequency $f_1$ thereby to generate the base band coded data and the data indicating the carrier intensity of the received RF signal.

The data decoding unit 242 decodes the received coded data in accordance with a predetermined coding scheme, decrypts the decoded data in accordance with a predetermined encryption scheme, and supplies the decrypted data to the data generating unit 222 and the control unit 210.

The carrier judging unit 246 receives the data indicating the power intensity of the received RF signal carrier from the receiving unit 250, judges the presence or absence of the received carrier, and supplies the judgment result to the control unit 210.

The transmission antenna (ANT) 282 is coupled to the transmission unit 230. The receiving antenna (ANT) 284 is coupled to the receiving unit 250. Also, the antennas 282 and 284 may be integrated as a single antenna.

The frequencies $f_1$ and $f_2$ are, for example, 300 MHz and 301 MHz, respectively. The frequency $f_{2i}$ is, for example, 301 MHz, 302 MHz, ..., or 305 MHz. The transmission output of the transmission unit (TX) 230 is, for example, 1 mW.

The control unit 210 includes a random number generating unit 211, a frequency switching unit 212 and a timing adjusting unit 213. The random number generating unit 211 generates a random number for selecting the transmission time slot at random. The frequency switching unit 212 switches the transmission frequency $f_{2i}$. The timing adjusting unit 213 adjusts the transmission timing.

A battery 290 supplies power to the component elements 210 to 270.

The control unit 210 is always in the active state after power is switched on. The control unit 210 supplies the memory control signal CTRL_M, the data generation control signal CTRL_ENC, the transmission control signal CTRL_TX, the receiving control signal CTRL_RX, the data decoding control signal CTRL_DEC, the carrier judgment control signal CTRL_CS and the wakeup unit control signal, respectively, to the memory 214, the data generating unit 222, the transmission unit 230, the receiving unit 250, the data decoding unit 242, the carrier judging unit 246 and the wakeup unit 270. The control unit 210 may be a microprocessor or a microcomputer operated in accordance with a program.

The memory 214 stores the information such as the tag ID (ID_tag) of the active RF-ID tag 202, the system ID (ID_system) for authentication, the encryption key/decryption key Ke, the present time T for authentication, the access record by the reader/writer 302, the control schedule and the time control sequence of the wakeup unit 270, the present residual power of the battery 290, the carrier sense period Tcs, the receiving process duration, the transmission period Tt and the transmission duration. The memory 214 supplies the present time T, the system ID and the encryption key/decryption key Ke to the data generating unit 222 and the data decoding unit 242.

These pieces of information are transmitted to the RF-ID tag 202 in advance by the reader/writer 302 and written in the memory 214 by the control unit 210. These pieces of information in the memory 214 are stored and updated under the control of the control unit 210.

The control unit 210 corrects the time on the timer 274 based on the time T in the memory 214, and updates by writing, in the memory 214, the present time T generated by the timer 274.

The system ID indicates the ID shared by the reader/writer 302 and plural RF-ID tags configured in the same group. The system ID may be the ID of the reader/writer 302.

The reader/writer 302 includes a control unit 310, a memory 314, a data generating unit 322, a transmission unit (TX) 330, a receiving unit (RX) 350, a data decoding unit 342, a timer 374, a transmission antenna (ANT) 382 and a receiving antenna (ANT) 384.

The control unit 310 transmits and receives the data to and from a host computer (not illustrated).

The data generating unit 322 includes an encryption unit 324 for encrypting the transmission data using the encryption key Ke in accordance with a predetermined encryption scheme stored in the memory 314. The data decoding unit 342 includes a decryption unit 344 for decrypting the received data using the encryption key/decryption key Ke in accordance with the predetermined encryption scheme.

The data generating unit 322 generates the data of a predetermined format including the command (CMD) received from the control unit 310, and by encrypting the particular data, encodes the encrypted data to thereby generate the coded data.

The transmission unit (TX) 330 modulates the carrier with the baseband coded data received from the data generating unit 322 and transmits the RF signal of frequency $f_1$. The transmission output of the transmission unit (TX) 330 is, for example, 100 mW.

The receiving unit (RX) 350 receives the RF signals of frequency $f_2$ or $f_{21}$ to $f_{2n}$. The data decoding unit 342 decodes the data received from the receiving unit 350, and by decrypting the decoded data, generates the baseband decrypted data, which is supplied to the control unit 310.

The timer 374 measures and generates the time.

The transmission antenna (TX) 382 is coupled to the transmission unit 330. The receiving antenna (ANT) 384 is coupled to the receiving unit 350. Also, the antennas 382 and 384 may be integrated into a single antenna.

The control unit 310, upon reception of the tag ID or tag information request command (hereinafter referred to simply as the tag information request command) from the host computer, supplies the data including the particular command to the data generating unit 322. This data may include the transmission frequency $f_2$ or $f_{2i}$ to be used by the RF-ID tag 202, the present reference time T and a new or updated control schedule and the time control sequence. Such a command may include the command to correct or update the time on the timer 274 in addition to the present time T. Such a command may also include a command to correct or update the schedule or the sequence stored in the memory 214 as well as the new or updated schedule or time control sequence.

Figure 2B:
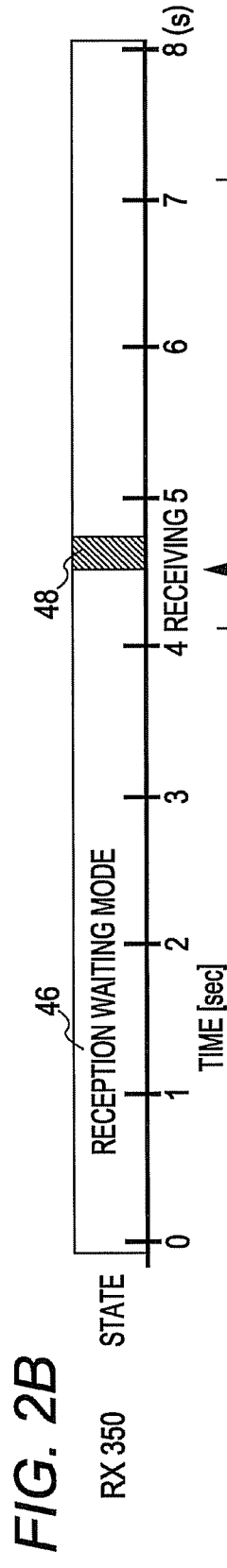
FIG. 2B illustrates an example of the time chart of the reception waiting mode and the process of receiving the RF signal of the reader/writer 2.
Figure 2C:
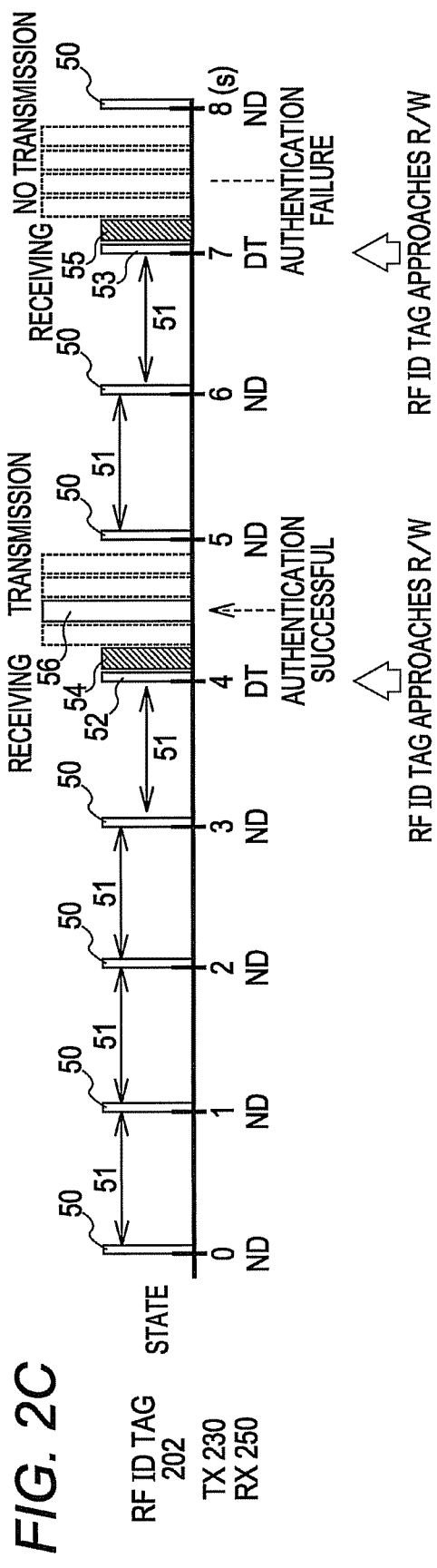
FIG. 2C illustrates an example of the time chart of the carrier sense period of the active RF-ID tag, the process of receiving the RF signal and the process of transmitting the RF signal carrying the response in a successful authentication.

FIG. 2A illustrates an example of the time chart for the transmission process 42 of the RF signal carrying the tag information request command (CMD) of the reader/writer 302. FIG. 2B illustrates an example of the time chart of the receiving process 48 of the RF signal and the reception waiting mode 46 of the reader/writer 302. FIG. 2C illustrates an example of the time chart of the carrier sense periods 50, 52 and 53 of the active RF-ID tag 202, the receiving processes 54 and 55 of the RF signal and the transmission process 56 of the RF signal carrying the response in the case of a successful authentication.

Referring to FIG. 2A, the data generating unit 322 of the reader/writer 302 generates and encrypts the data including the tag information request command for the RF-ID tag received from the control unit 310. And the data generating unit 322 generates the encoded encryption data by encrypting and encoding the encrypted data. The transmission unit 330 periodically transmits the RF signal carrying the command at sufficiently short time intervals in the continuous time slots of the transmission process 42.

Referring to FIG. 2C, in the active RF-ID tag 202, the receiving unit 250 and the carrier judging unit 246 are enabled (activated) by the control unit 210 for the carrier sense periods 50 and 52 generated for a predetermined duration with a predetermined period Tcs in accordance with the wakeup signal of the wakeup unit 274. For example, the predetermined duration is about 1 ms to 10 ms. For example, the predetermined period Tcs is 2 seconds. As a result, the receiving unit 250 enters the reception waiting mode, and the carrier judging unit 246 judges the presence or absence of the received carrier in accordance with the data indicating the intensity of the received RF signal carrier power from the receiving unit 250. In the case where the RF-ID tag 202 is not in proximity to the reader/writer 302, the carrier judging unit 246 fails to detect the carrier (ND) and judges that no carrier exists.

During the period 51 between the carrier sense periods 50, the RF-ID tag 202 enters the dormant mode, so that only the control unit 210 and the wakeup unit 270 are enabled or powered on (activated). The other component elements 214 to 250 are disabled or powered down (deenergized). The time length of the dormant period 51 may be shorter than the time length between the ending point of the carrier sense period 50 and the starting point of the next carrier sense period 50.

In the case where the RF-ID tag 202 approaches the reader/writer 302 and the receiving unit 250 of the RF-ID tag 202 receives the RF signal, the carrier judging unit 246 detects the carrier of the RF signal during the carrier sense period 52 (DT) and judges that the carrier exists.

In response to the judgment that the carrier exists, the receiving unit 250 and the data decoding unit 242 are enabled for a predetermined duration (say, 100 ms) during the period of the immediately following receiving process 54.

The receiving unit 250 receives and demodulates the RF signal and generates the encoded encryption data including the command. The data decoding unit 242 decodes the particular data and by decrypting the encrypted data, retrieves and supplies the command to the control unit 210.

The control unit 210 authenticates the reader/writer 302 using both the system ID and the time T included in the command. In the case where the authentication succeeds, the control unit 210, in response to the command, enables the data generating unit 222 and the transmission unit 230 for a predetermined duration (say, 100 ms) in the time period of the transmission process 56 selected at random during a predetermined period. The data generating unit 222 encrypts the data including the required information such as the system ID (ID_system), the time T and the tag ID (ID_tag) retrieved from the memory 214 and encodes the encrypted data. The other required information includes the contents, quantity and condition, the shipper, the place through which the package is sent and moved, and the address of the commodity in the package. The transmission unit 230 modulates the carrier with the response data including the encrypted tag ID and transmits the RF signal.

In the case where the authentication ends in a failure, on the other hand, the process is ended without generating or transmitting the data.

Referring to FIG. 2B, the receiving unit 350 of the reader/writer 302 is always kept in the reception waiting mode 46. The receiving unit 350, upon reception of the RF signal by the approach of the RF-ID tag 202, demodulates the received RF signal during the period of the receiving process 48 thereby to generate the encoded encryption data.

The data decoding unit 342 decodes the decoded encryption data, regenerates the response data including the tag ID by decrypting the decoded encryption data, and supplies the regenerated response to the control unit 310.

In response to the received and regenerated response data, the control unit 310 authenticates the RF-ID tag 202 using the system ID and the time T included in the particular response, and supplies the particular tag ID to the host computer.

The host computer processes the tag ID and uses it for monitoring and managing the commodity distribution or persons.

Normally, the time during which the RF-ID tag 202 is not in proximity to the reader/writer 302 is much longer than the time during which the RF IF tag 202 is in proximity thereto. Due to the configuration described above, therefore, the active RF-ID tag 202 enters the dormant mode for most of the period.

Thus, the power consumption of the active RF-ID tag 202 is remarkably reduced, and the operational time of the battery 290 is considerably lengthened.

Also, the reader/writer 302 and the RF-ID tag 202 normally encrypt the transmission data and authenticate each other using both the time T and the system ID. As a result, the data transmitted by the reader/writer 302 and the RF-ID tag 202, if the data is intercepted by a third party, is less liable to be used illegally. Thus, the security of the reader/writer 302 and the RF-ID tag 202 is improved.

Figure 3:
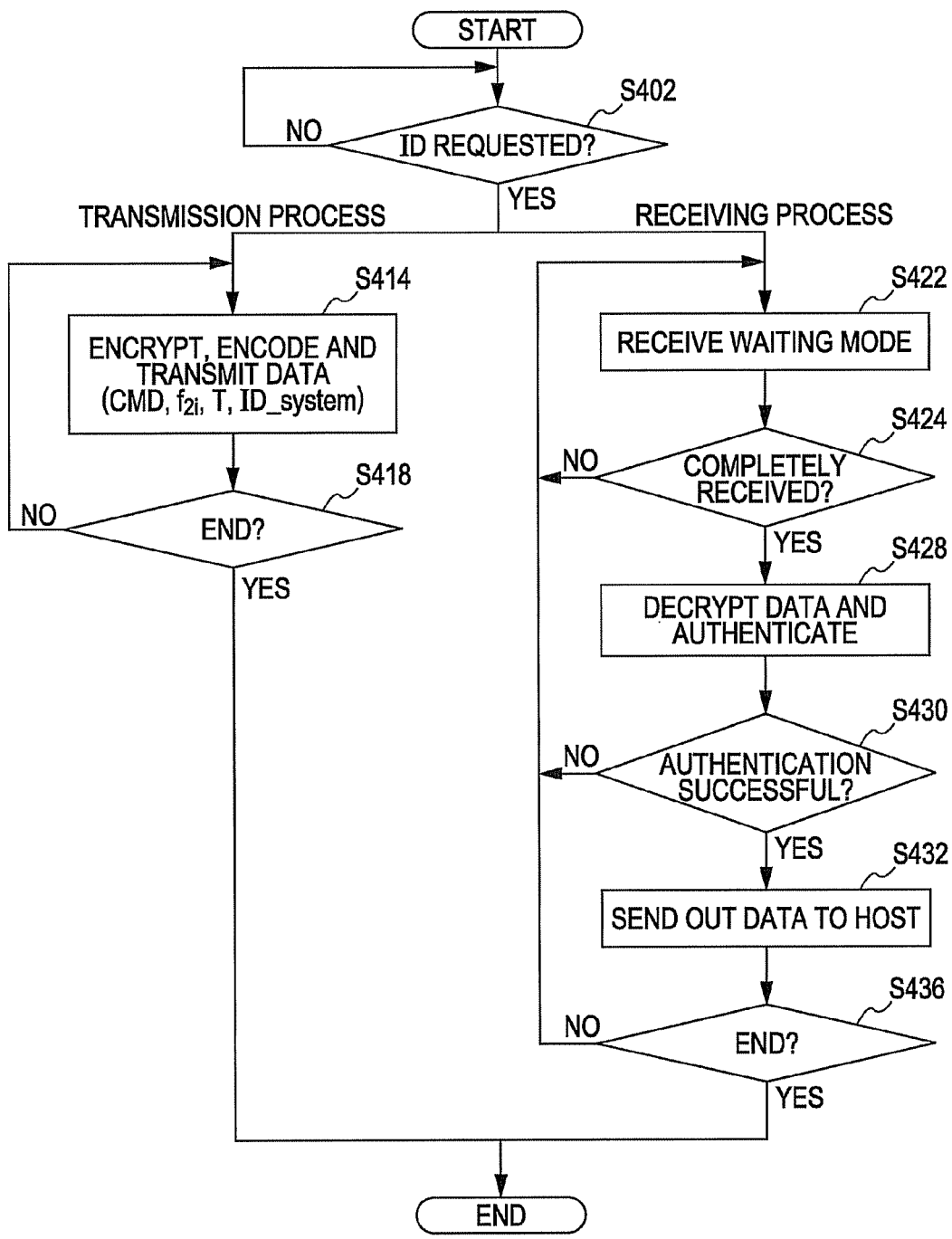
FIG. 3 illustrates an example of the operation flow of the process executed by the reader/writer.
Figure 4A:
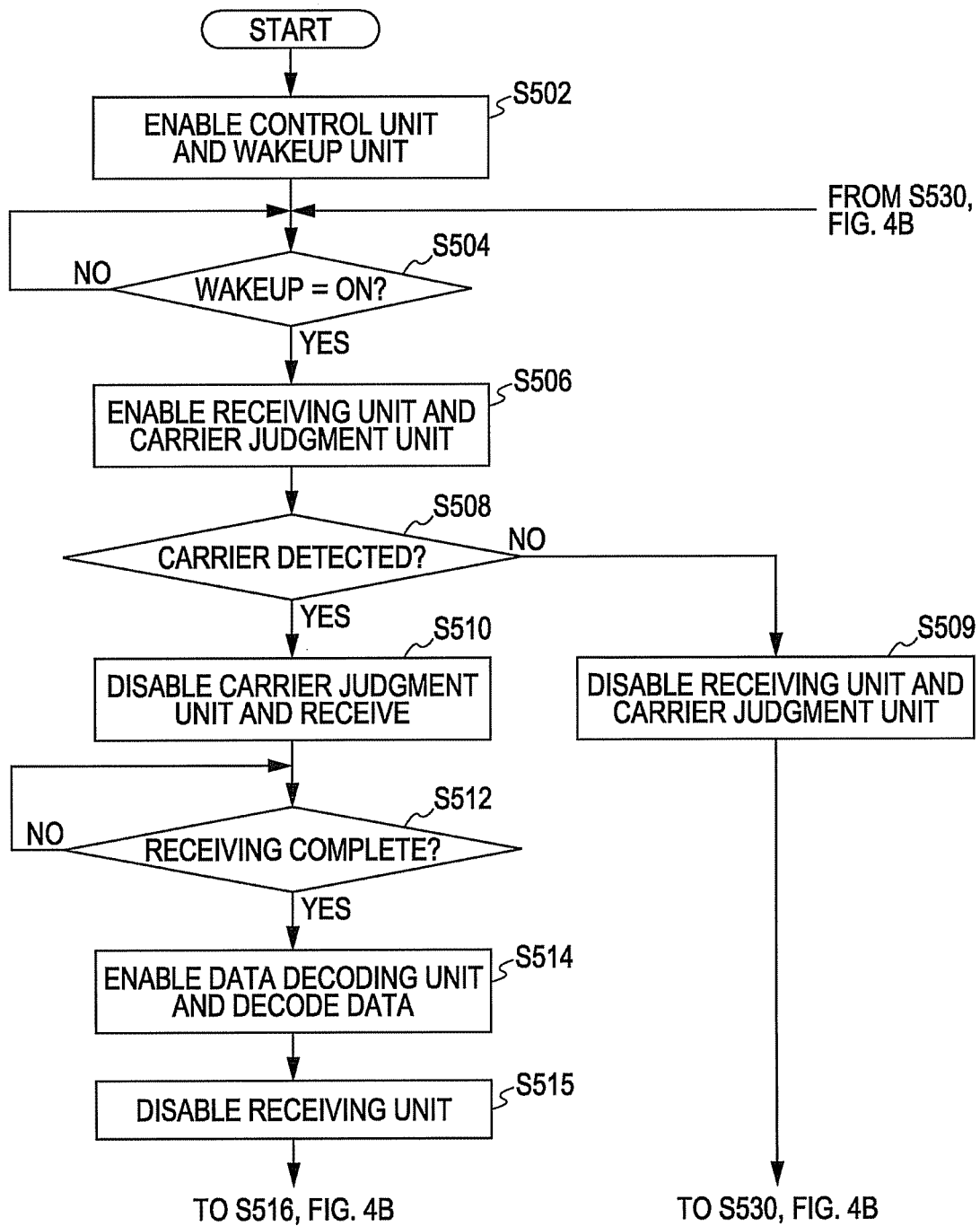
FIGS. 4A and 4B illustrate an example of the operation chart of the process executed by the active RF-ID tag.
Figure 4B:
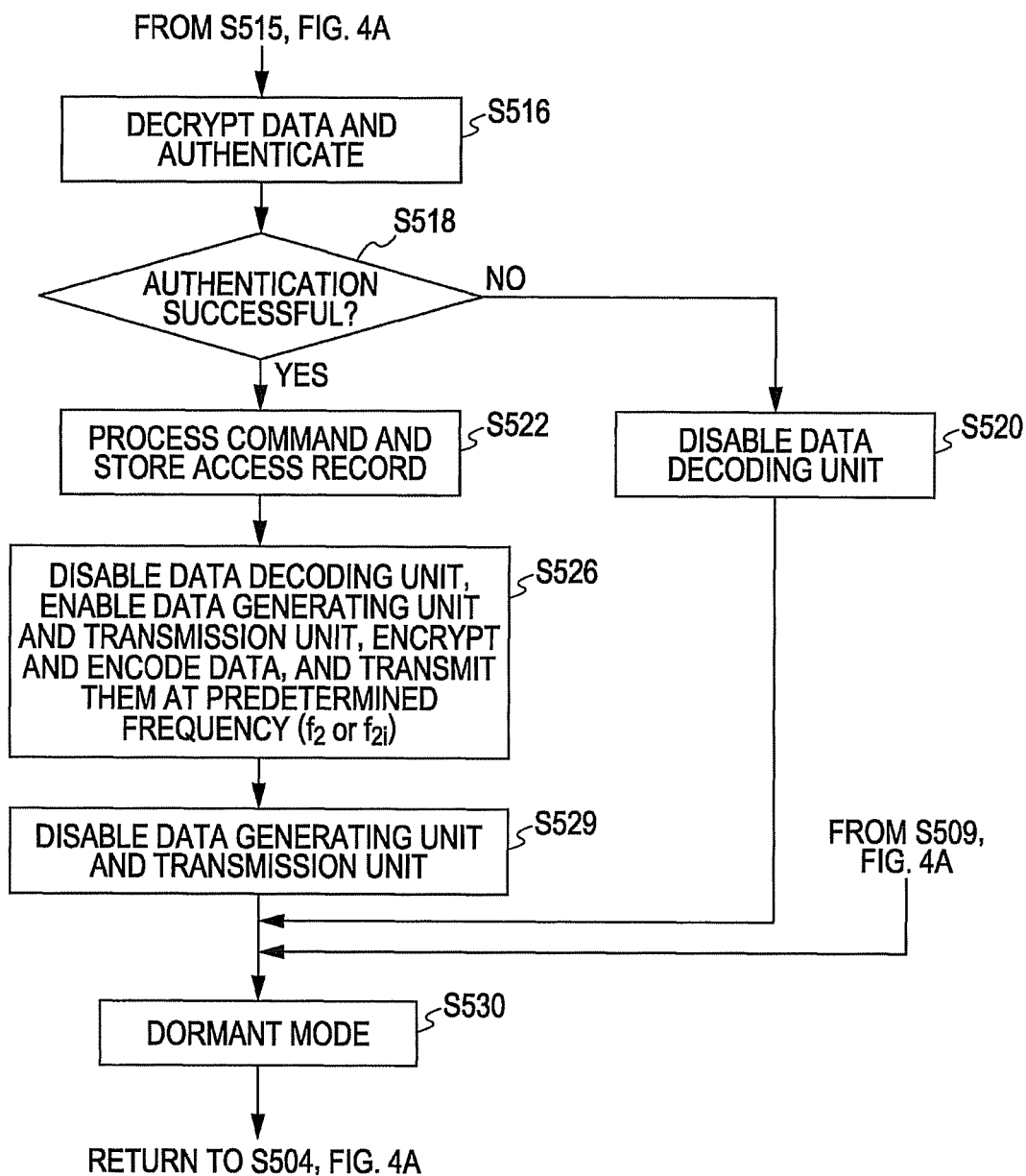

FIG. 3 illustrates an example of the operation flow of the process executed by the reader/writer 302. FIGS. 4A and 4B illustrate an example of the operation flow of the process executed by the active RF-ID tag 202.

Referring to FIG. 3 illustrating the operation S402, the control unit 310 of the reader/writer 302 judges whether a tag information request is received from the host computer or not. The operation S402 is repeated until the tag ID is requested. Upon judgment that a tag information request is received, the process proceeds to both the operation S414 for transmission and the operation S422 for reception.

In the operation S414, the control unit 310 supplies the data generating unit 322 with both the tag information request command and the related information. In the data generating unit 322, the tag information request command received from the control unit 310, the present time T retrieved from the memory 314 and the data including both the system ID (ID_system) and the ID of the reader/writer 302 are encrypted in accordance with a predetermined encryption scheme such as DES (Data Description Standard), triple DES or AES (Advanced Encryption Standard) using the encryption key retrieved from the memory 314. The control unit 310 encodes the encrypted data in accordance with a predetermined coding scheme such as NRZ (Non Return to Zero) or the Manchester coding scheme. Further, the transmission unit 330 transmits the RF signal of the frequency $f_1$ by modulating the carrier with the encoded data during the time zone of the transmission process 42 illustrated in FIG. 2A. The control unit 310 may cause the tag information request command to contain the data designating the transmission frequency $f_2$ or the variable transmission frequency $f_{2i}$ of the response to the command, the data indicating the time or the time slot when the variable transmission frequency $f_{2i}$ is to be used, the data indicating the present time T, the control schedule and the time control sequence.

The reader/writer 302 may change the frequency $f_{2i}$ thereof for each plural commands in plural transmission periods tRW-CY (for example, for each plural commands in the transmission periods tRW-CY in the number corresponding to at least one carrier sense period).

Even in the case where plural RF-ID tags exist at the same time, therefore, the probability of mutual conflict of the response transmission from the RF-ID tags is reduced, so that an increased number of RF-ID tags can be identified at the same time by the reader/writer 302.

The operation S418 judges whether the control unit 210 should end the data transmission or not. Upon judgment that the data transmission should be ended, the process leaves the routine. Upon judgment that the data transmission should be continued, on the other hand, the process returns to the operation S414. In FIG. 2A, the data transmission is repeatedly continued.

Referring to FIG. 4A, in the case where the RF-ID tag 202 is started in the operation S502, the control unit 210 and the wakeup unit 270 are enabled. Once the RF-ID tag 202 is started, the control unit 210 and the wakeup unit 270 are always enabled and active. The wakeup unit 270 supplies the control unit 210 with the wakeup signal indicating the timing of the carrier sense operation of the received RF signal at a predetermined period Tcs in accordance with both the timer 274 and the time control sequence. In the operation S504, the control unit 210 judges whether the wakeup signal received from the wakeup unit 270 is on or not. The control unit 210 repeats the operation S504 until the wakeup signal turns on.

In the case where the operation S504 judges that the wakeup signal is on, the receiving unit 250 and the carrier judging unit 246 are enabled by the control unit 210 for a short duration of, say, about 1 ms to 10 ms in the operation S506. The receiving unit 250 assumes the RF signal waiting mode. Based on the data indicating the carrier power received from the receiving unit 250, the carrier judging unit 246 judges that the carrier of the received RF signal exists and supplies the judgment result to the control unit 210. In the operation S508, the control unit 210 judges, according to the judgment result, whether the carrier is detected or not. Upon judgment that the carrier is not detected, the receiving unit 250 and the carrier judging unit 246 are disabled (deactivated) by the control unit 210 in the operation S509. After that, the process proceeds to the operation S530.

Upon judgment in the operation S508 that the carrier is detected, the carrier judging unit 246 is disabled by the control unit 210 in the operation S510. Further, while the receiving unit 250 is kept enabled during a predetermined duration of, say, 100 ms to 200 ms, the RF signal of the frequency $f_1$ carrying the command from the reader/writer 302 is received (FIG. 2C, reception 54) thereby to demodulate the received RF signal. In the operation S512, the control unit 210 judges whether the reception of the RF signal by the receiving unit 250 is completed or not. The operation S512 is repeated until the reception of the RF signal is completed.

Upon judgment that the reception of the RF signal is completed in the operation S512, the control unit 210 enables the data demodulation unit 242 in the operation S514. The data demodulation unit 242 receives the receiving data from the receiving unit 250 under the control of the control unit 210, and decodes it in accordance with a predetermined coding scheme. In the operation S515, the control unit 210 disables the receiving unit 250.

Referring to FIG. 4B, the decoded data is decrypted in accordance with a predetermined encryption scheme using the encryption key/decryption key Ke retrieved from the memory 214 by the data decoding unit 242 under the control of the control unit 210 in the operation S516. The data decoding unit 242 supplies the control unit 210 with the data containing the decrypted command, the tag ID (ID_tag), the time T and the system ID (ID_system). This data may contain the control schedule and the time control sequence. The control unit 210, after receiving the particular data, compares the decrypted time T and the decrypted system ID with the time T and the system ID, respectively, stored in the memory 214. The control unit 210 judges whether they coincide with each other or not. In this way, the reader/writer 302 is authenticated.

In the operation S518, the control unit 210 judges whether the authentication has succeeded or not. Upon judgment that the authentication has failed, the control unit 210 disables the data decoding unit 242 in the operation S520. After that, the process proceeds to the operation S530.

Upon judgment in the operation S518 that the authentication has succeeded, the control unit 210, in the operation S522, receives the decoded and encrypted data containing the tag information request command from the data decoding unit 242. The control unit 210 processes the received command decrypted and contained in the decrypted data, and stores the access record by the reader/writer 302 in the memory 214.

In the case where the received data contains the time correction command of the present time T, the control unit 210 corrects or updates the time on the timer 274 of the wakeup unit 270 to the time T.

In the operation S526, the control unit 210 enables the data generating unit 222 and the transmission unit 230 in one time slot selected at random from a predetermined number of time slots within a predetermined time length in accordance with the tag information request command. The time slot thus selected constitutes the time zone of the transmission process 56 illustrated in FIG. 2C.

In the data generating unit 222, the data including the tag ID (ID_tag) of the RF-ID tag 202, the time T, the system ID (ID_system) and the ID of the reader/writer 302 read from the memory 214 are encrypted using the encryption key Ke in accordance with a predetermined encryption scheme. The resulting encrypted data is encoded in accordance with a predetermined encoding scheme and supplied to the transmission unit 230.

The transmission unit 230 modulates the carrier with the encoded encryption data, and transmits the RF signal of frequency $f_2$ or $f_{2i}$ through the antenna 282 (FIG. 2C, transmission 56). The operation of switching to the frequency $f_{2i}$ is performed by the frequency switching unit 212 of the control unit 210. The timing adjusting unit 213 adjusts the period of plural time slots to a predetermined period.

In the operation S529, the control unit 210 disables the data generating unit 222 and the transmission unit 230. In the operation S530, the control unit 210 sets the RF-ID tag 202 in a dormant mode. In the dormant mode, only the control unit 210 and the wakeup unit 270 are basically kept enabled, while the other component elements 214 to 250 are disabled.

Referring again to FIG. 3, in the operation S422, the control unit 310 enables the receiving unit 350 into the reception waiting mode. The receiving unit 350 waits for the reception of the RF signal of frequency $f_2$ (reception waiting 46) and receives the RF signal (receiving process 48). In the operation S424, the control unit 310 judges whether the receiving unit 350 has completely received the RF signal or not. Until the reception is completed, the operation S422 to S424 are repeated. Upon judgment that the reception is complete, the process proceeds to the operation S428.

In the operation S428, the receiving unit 350 supplies the received data to the data decoding unit 342. The data decoding unit 342 decodes the received data in accordance with a predetermined coding scheme, and by decrypting the decoded data in accordance with a predetermined encryption scheme, supplies the control unit 310 with the judgment that the data is received and the decrypted data. The control unit 310 compares the decryption time T and the system ID with the time T and the system ID which are respectively stored in the memory 314. The control unit 310 judges whether they coincide with each other thereby to authenticate the RF-ID tag 202. Even in the case where there is an error of not more than a predetermined range (for example, ±0.5 sec) between the reception time T and the stored time T in the control unit 210 of the RF-ID tag 202 and the control unit 310 of the reader/writer 302, both may be judged as coincident with each other.

In the operation S430, the control unit 310 judges whether the authentication is successful or not. Upon judgment that the authentication has failed, the process returns to the operation S422. On the other hand, upon judgment that the authentication has succeeded, the process proceeds to the operation S432.

In the operation S432, the control unit 310 stores the decoded data in the memory 314 and sends it out to the host computer. In the operation S436, the control unit 310 judges whether the data waiting mode is to be ended or not. Upon judgment that the data waiting mode is to be ended, the process leaves this routine. Upon judgment that the data waiting mode is to be continued, on the other hand, the process returns to the operation S422. In FIG. 2B, the data waiting mode is repeatedly continued.

As described above, the reader/writer 302 transmits the RF signal periodically at sufficiently short intervals, and is waiting to receive the RF signal in RF signal waiting mode. Therefore, the carrier sense time of the RF-ID tag 202 can be remarkably reduced. In the case where the signal transmission and reception are carried out only several times a day in such job as delivery/shipment and most of the operation time is occupied by the carrier sense operation, for example, the reduction in the power consumption of the whole RF-ID tag 202 remarkably reduces the whole power consumption.

As a control schedule stored in the memory 214, the time zone between a predetermined time and another predetermined time in nighttime (for example, 6:00 p.m. to 6:00 a.m.) on holidays and weekdays may be designated and so may be the time zone between a predetermined time and another predetermined time in daytime (for example, 6:00 a.m. to 6:00 p.m.) on weekdays. In this case, the wakeup unit 270 generates no wakeup signal during the designated holidays and nighttime. As a result, the RF-ID tag 202 enters into the dormant mode and carries out no carrier sense operation at all except at a predetermined period (for example, 1 second) during the daytime of weekdays.

The wakeup unit 270 may generate the wakeup signal in accordance with the residual power capacity P of the battery 290 stored in the memory 214 under the control of the control unit 210. In the case where the residual power capacity P of the battery is sufficiently large, the carrier sense operation is carried out at comparatively short intervals (for example, 1 second), while in the case where the residual power capacity P is reduced below the threshold value Pth, on the other hand, the carrier sense operation may be carried out at comparatively long intervals (for example, 2 seconds).

As described above, the record of access by the reader/writer is stored in the memory 214. Even an illegal access, if any, by another reader/writer other than the reader/writer 302 is recorded in the log. By reading the access record with the reader/writer 302 and analyzing the access record with the host computer, therefore, the illegal access can be discovered.

The configuration and operations of the active RF-ID tag 202 and the reader/writer 302 are discussed in Japanese Laid-open Patent Publication No. 2006-338489 (corresponding to US2006/276206-A1), the entire contents of which are incorporated herein by reference.

The active RF-ID tag having a sensor for detecting a physical quantity or a state in respect of the surrounding environment to record the detection values is read by the reader/writer. In this way, the detection value data of the physical quantity or the state can be collected with the tag ID. In the case where the difference between the preceding measurement and the present measurement is not more than a threshold value, such data is not recorded. In this configuration, the power required for data recording can be reduced, so that the battery operation time of the RF-ID tag is lengthened for a reduced required memory capacity.

In the case where a sensor provided for the active RF-ID tag 202 illustrated in FIGS. 1 to 4B to record the detection value periodically, the configuration of the wakeup unit 270 can be included such that the wakeup unit 270 generates the wakeup signal at predetermined interval, and the sensor is accordingly enabled temporarily to store the detection value data in the memory 214 periodically.

Figure 5:
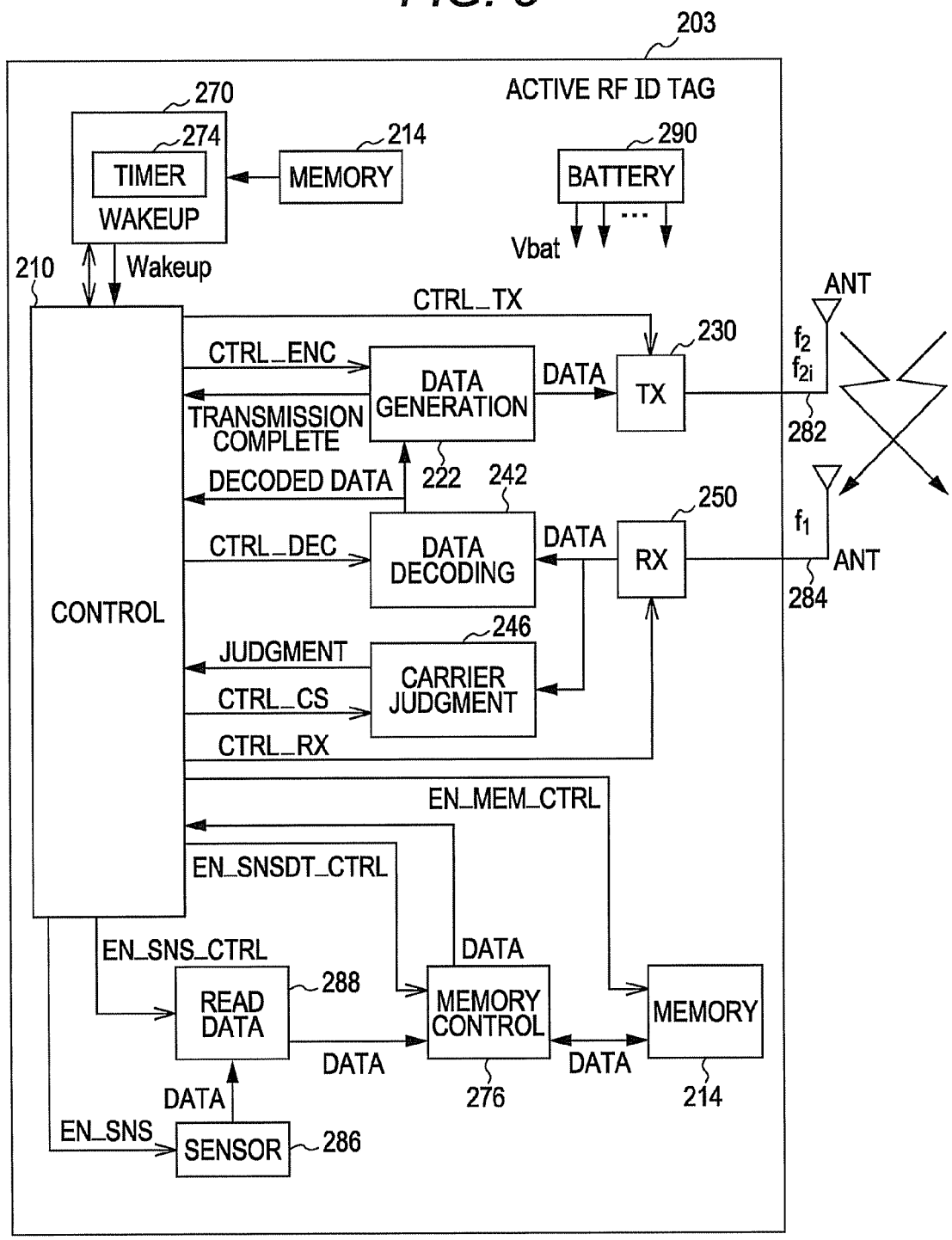
FIG. 5 illustrates an example of the configuration of the active RF-ID tag as an active non-contact information storage unit modified to detect the physical quantities and accumulate the detection value data.

FIG. 5 illustrates the configuration of the active RF-ID tag 203 as an active non-contact information recording unit modified to accumulate the detection value data detected as a physical quantity. With the RF-ID tag 203, the reader/writer 302 illustrated in FIG. 1 can be used.

In addition to the component elements 210 to 214, 222 to 284 and 290 of the RF-ID tag 202 illustrated in FIG. 1, the RF-ID tag 203 includes a sensor data reader 288 for grasping the detection value and holding the data of a memory control unit 276, a sensor 286 and the detection value in the sensor 286. The configuration of the other parts of the RF-ID tag 203 is similar to that of the RF-ID tag 202 illustrated in FIG. 1. The battery 290 supplies power to the component elements 210 to 276, 286, 288.

The component elements 222 to 246, 270, 276 and 288 may be packaged in the form of hardware as independent circuits or as a part of the control unit 210. At least a part of the component elements 222 to 246, 270, 276 and 288 may be packaged in the form of software as a function of the control unit 210 operated in accordance with the program stored in a memory 214.

The control unit 210, in response to the wakeup signal from the wakeup unit 270, supplies control signals EN_MEN_CTRL, EN_SNSDT_CTRL, EN_SNS and EN_SNS_CTRL for enabling or disabling the memory 214, the memory control unit 276, the sensor 286 and the data reader 288.

The control unit 210, in response to the tag information request command CMD from the reader/writer 302, causes the memory control unit 276 to read the storage data DATA of the accumulated detection value from the memory 214. The configuration and operation of the RF-ID tag 203 and other component parts are similar to those of the RF-ID tag 202 illustrated in FIG. 1.

In the RF-ID tag 203, in accordance with the wakeup signal from the wakeup unit 270, the control unit 210 enables or disables the sensor 286 and the data reader 288 or the receiving unit 250 and the carrier judging unit 246.

The memory control unit 276, in accordance with the wakeup signal from the wakeup unit 270, acquires the detection value DATA of the sensor 286 from the data reader 288. The memory control unit 276 stores the detection value DATA in the memory 214 together with the present date and time (date/hour). The control unit 210 carries out the carrier sense operation 50, 53 periodically, and in response to the tag information request command by the reader/writer 302, sends back such date/hour and the detection value data together with the tag ID.

In the RF-ID tag 203, the control unit 210 causes the sensor 286 to detect the physical quantity (for example, ambient temperature) or the value of the state. The control unit 210 causes the data reader 288 to read the current data and write the current detection value in the memory 214. Then, the RF-ID tag 203 carries out the carrier sense operation. The memory control unit 276 reads the storage data of the detection value from the memory 214 and supplies it to the control unit 210.

The RF-ID tag 203 is used, as an example, for managing the transportation route of a refrigeration container and the date and time to thereby track the temperature change in the container. In this case, the sensor 286 is a temperature sensor. The reader/writer 302 is arranged in the container and may accumulate the detection value data from the RF-ID tag 203.

Figure 6A:
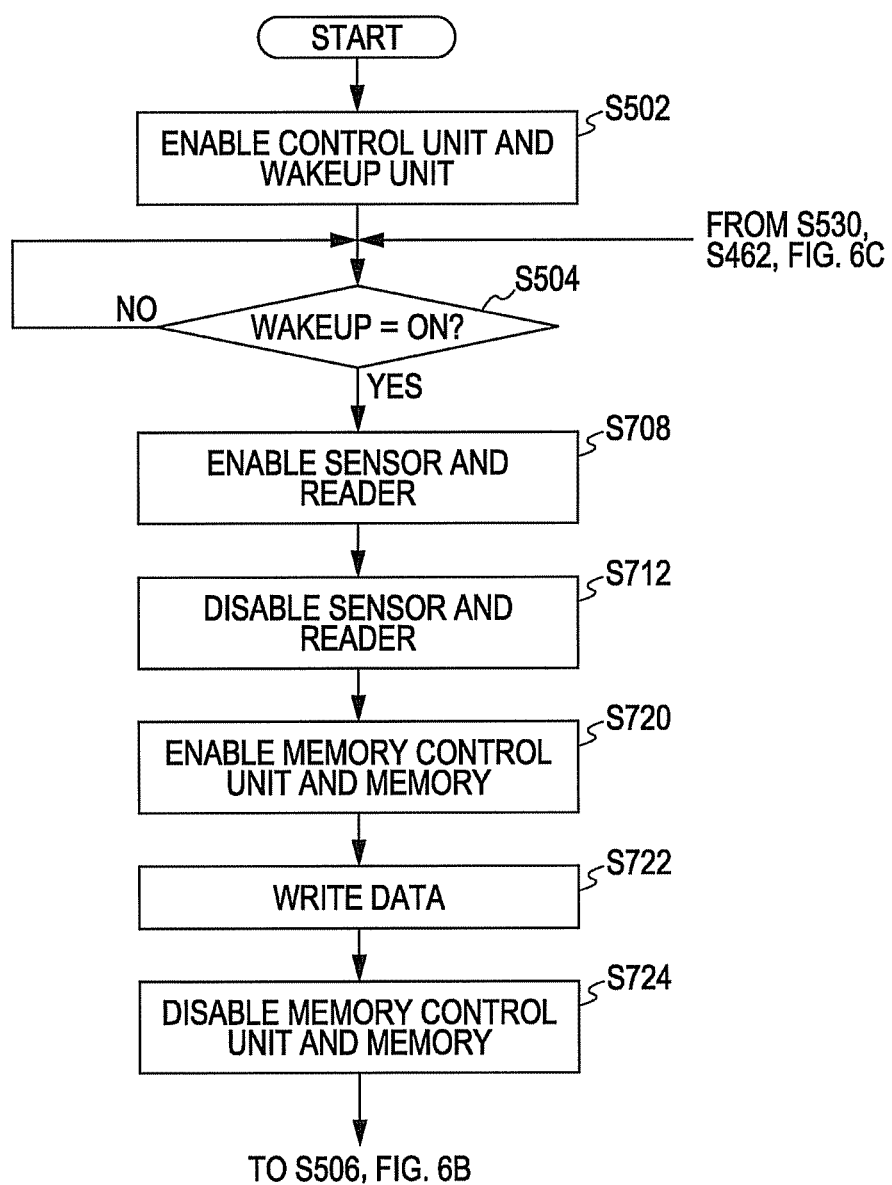
FIGS. 6A to 6C illustrate an example of the operation flow of the process executed by the active RF-ID tag illustrated in FIG. 5.
Figure 6B:
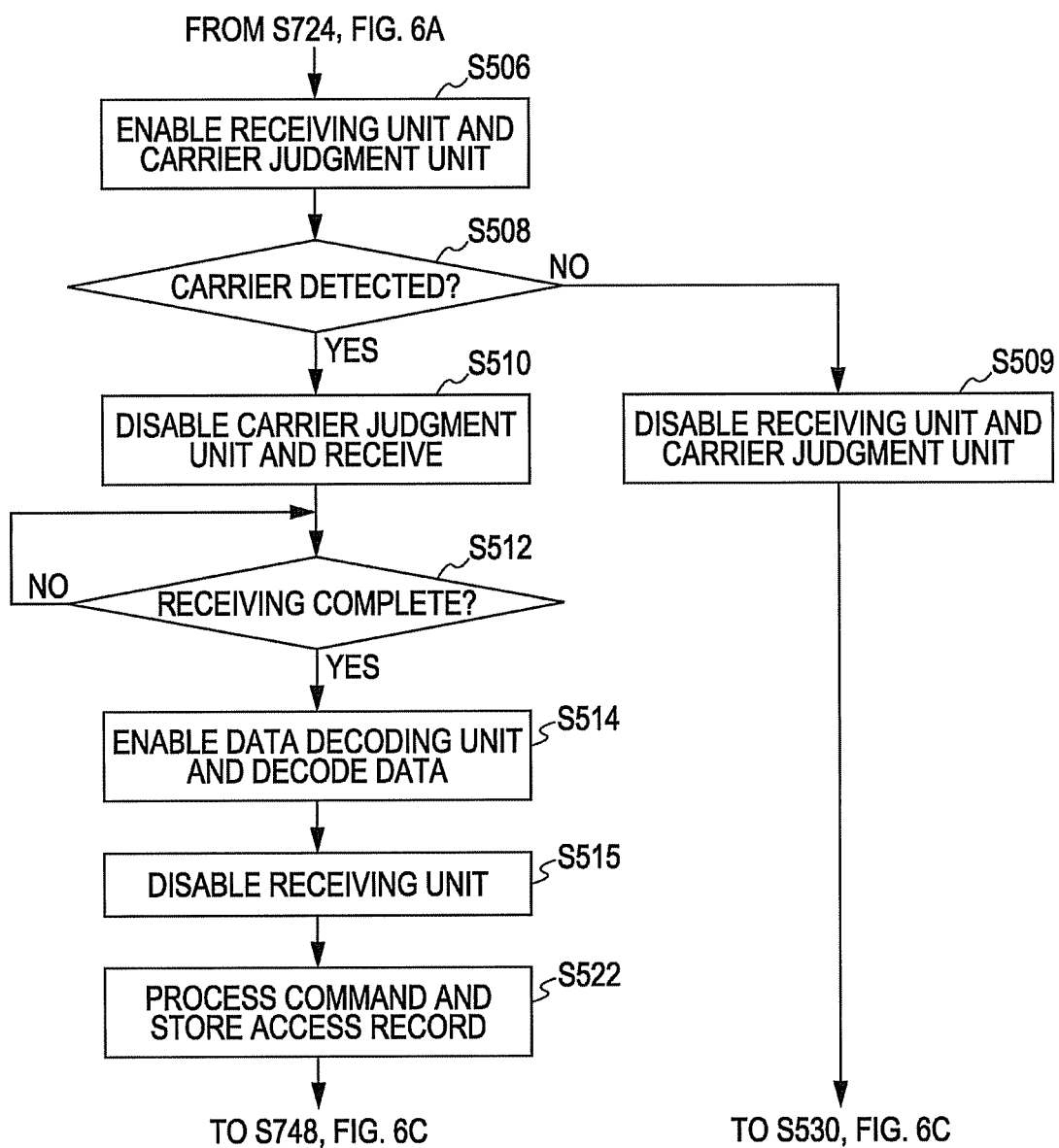
Figure 6C:
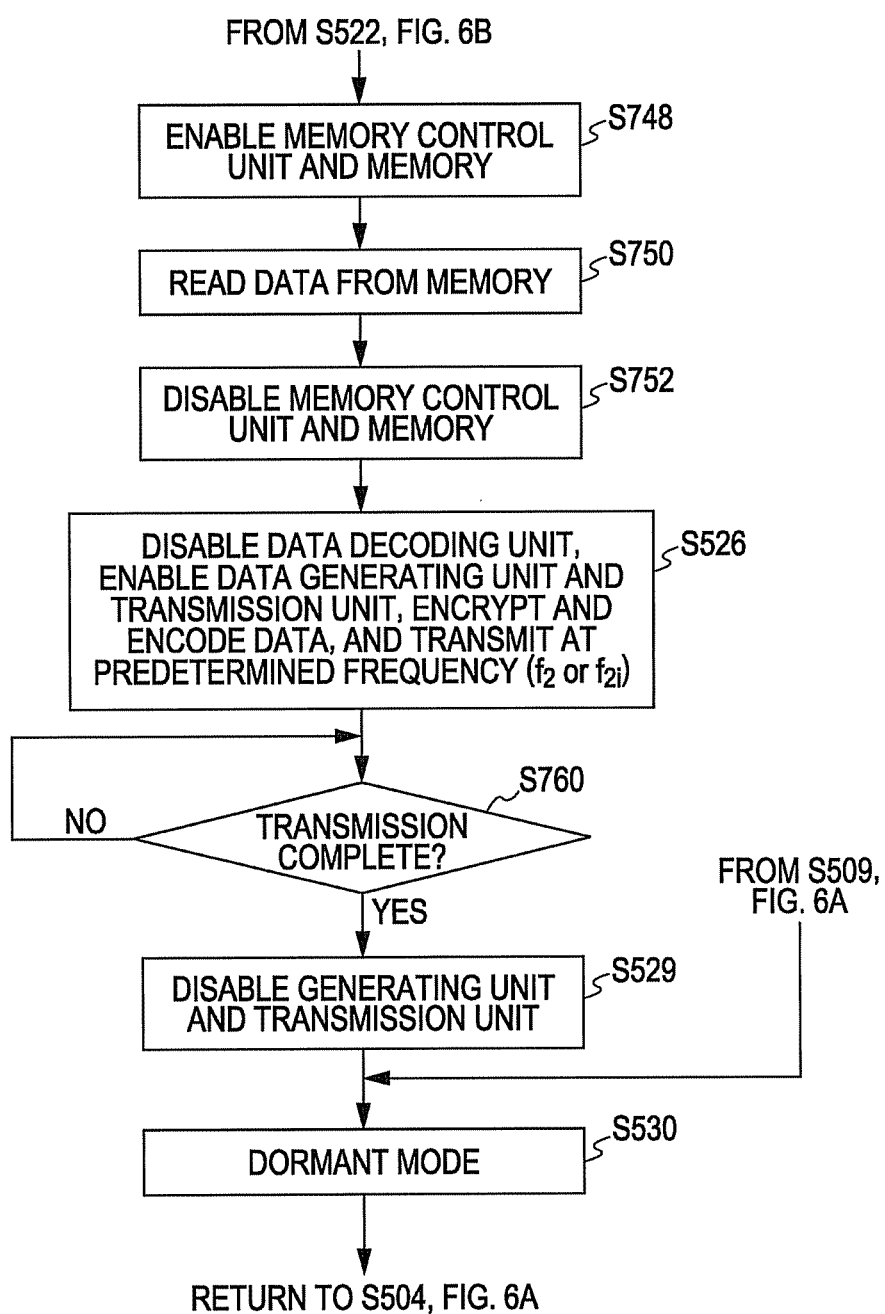

FIGS. 6A to 6C illustrate an example of the operation flow of the process executed by the active RF-ID tag 203 illustrated in FIG. 5. To simplify the drawings, however, the process for authentication in FIGS. 4A and 4B is not illustrated.

Referring to FIG. 6A, the operations S502 to 504 are similar to the corresponding operations illustrated in FIG. 4A and not described again.

In the operation S708 after the operation S504, the control unit 210 enables the sensor 286 and the data reader 288. And the control unit 210 causes the sensor 286 to detect the temperature while at the same time causing the data reader 288 to read the detection value of the temperature. In the operation S712, the control unit 210 disables the sensor 286 and the data reader 288.

In the operation S720, the control unit 210 enables the memory control unit 276 and the memory 214. In the operation S722, the control unit 210 provisionally enables the memory control unit 276, which in turn stores the present detection temperature value from the data reader 288 in the memory 214. In the operation S724, the control unit 210 disables the memory control unit 276 and the memory 214.

Referring to FIG. 6B, the operations S506 to S522 are similar to the corresponding operations in FIGS. 4A and 4B and not explained again.

Referring to FIG. 6C, in the operation S748, the control unit 210 enables the memory control unit 276 and memory 214 in response to a command. In the operation S750, the memory control unit 276 reads the storage data of the recorded detection temperature value from the memory 214 and supplies the temperature value to the control unit 210 (time zone 65). In the operation S752, the control unit 210 disables the memory control unit 276 and the memory 214.

The operation S526 is similar to the corresponding operation in FIG. 4B. The control unit 210 transmits to the reader/writer 302 the RF signal carrying the storage data of the encrypted and encoded detection temperature value and the tag ID.

In the operation S760, the control unit 210 judges whether the transmission is complete or not. Until the transmission is complete, the operation S760 is repeated. Upon judgment that the transmission is complete, the process proceeds to the operation S529. The operation S529 is similar to the corresponding one in FIG. 4B.

In the operation S530, the control unit 210 sets the RF-ID tag 203 in the dormant mode. In the dormant mode, only the control unit 210 and the wakeup unit 270 are enabled or powered on, while the other component elements 214, 222 to 250, 276 and 286 to 288 are disabled or powered down. After that, the process returns to the operation S504 in FIG. 6A.

Even in the case where the RF-ID tag 203 both detects the physical quantity and carries out the carrier sense operation in response to the wakeup signal and transmits the response signal for carrying the detection data in response to the request command from the reader/writer 302, the reader/writer 302 may not normally receive the response signal for carrying the detection data depending on the environmental situation of electromagnetic wave propagation.

In the case where the RF-ID tag transmits the detection data having redundancy in response to the request command from the reader/writer, the reader/writer can compensate for or interpolate the drop-off data.

Figure 7:
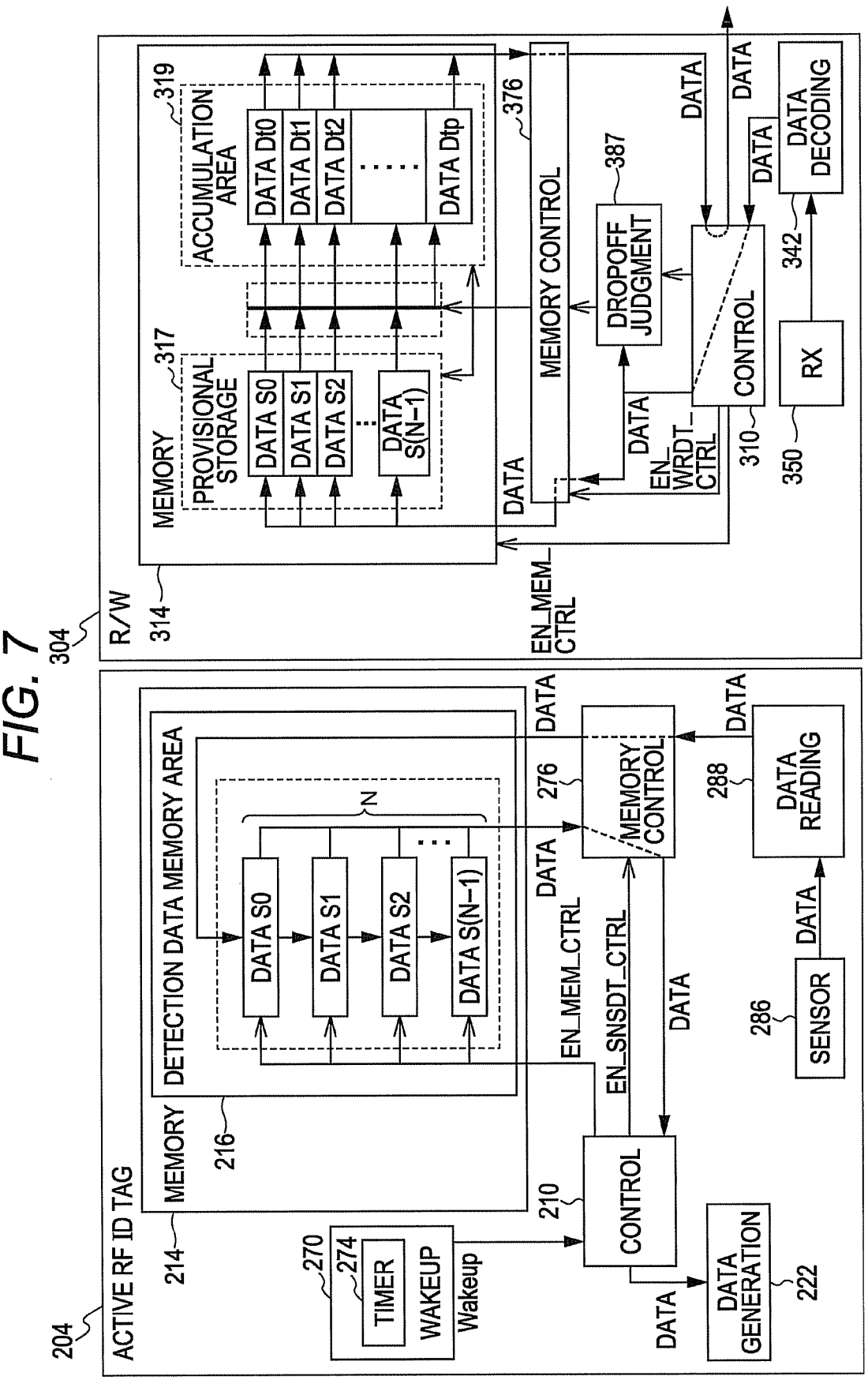
FIG. 7 illustrates an example of the configuration of only the related parts of the reader/writer and the active RF-ID tag as an active non-contact information storage unit according to an embodiment of the invention.

FIG. 7 illustrates the configuration of only the related parts of the reader/writer 304 and the active RF-ID tag 204 as an active non-contact information storage unit according to an embodiment of the invention.

Referring to the left side of FIG. 7, the memory 214 in the RF-ID tag 204 has the detection data memory area 216. The detection data memory area 216 has N plural data areas S0 to S(N−1) in parallel. The other parts of the configuration of the RF-ID tag 204 are similar to those of the RF-ID tags 202, 203 illustrated in FIGS. 1 and 5.

Referring to the right side of FIG. 7, the reader/writer 304 has a memory control unit 376 and a data drop-off judging unit 387. The data drop-off judging unit 387 may be a part of the control unit 310. The memory 314 has a provisional storage area 317 and an accumulation area 319. The provisional storage area 317 has N data areas S0 to S(N−1) in parallel. The accumulation area 319 has the data areas Dt0 to Dtp (p>N) for accumulating a predetermined number p+1 of data. The other parts of the configuration of the reader/writer 304 are similar to those of the reader/writer 302 in FIG. 1.

The control unit 210 of the RF-ID tag 204 supplies the control signals EN_MEM_CTRL and EN_SNSDT_CTRL to the memory 214 and the memory control unit 276 in accordance with the wakeup signal from the wakeup unit 270, and stores the one latest detection DATA in the data area S0 in the detection data memory area 216. In the process, the preceding N−1 detection value data in the data areas S0 to S(N−2) are stored by being shifted physically or logically in the data areas S1 to S(N−1) in the reverse chronological order from the latest one (t(N−1)). The data in the oldest data area S(N−1) may be deleted.

In response to the detection data request command from the reader/writer 304, the control unit 210 causes the memory control unit 276 to read the N detection value data D0 to D(N−1) from the memory areas S0 to S(N−1) and receives the N latest detection data Dt0 to Dt(N−1). The control unit 210 transmits to the reader/writer 304 the response signal of frequency $f_2$ or $f_{2i}$ carrying the N detection value data D0 to D(N−1) together with the tag ID.

In the reader/writer 304, the control unit 310, in response to the N detection value data D0 to D(N−1) from the RF-ID tag 204, causes the memory control unit 376 to write the particular N detection value data D0 to D(N−1) in the N provisional storage areas S0 to S(N−1) of the provisional storage region 317. The control unit 310 supplies the received detection value data to the data drop-off judging unit 387 and causes the drop-off data to be detected.

The data drop-off judging unit 387 receives, through the control unit 310, the detection data DATA decoded by the data decoding unit 342, and judges whether the data drop-off exists in the decoded detection data DATA or not.

The memory control unit 376, in accordance with the judgment of the data drop-off judging unit 387, stores the N detection value data S0 to S(N−1) provisionally stored in the provisional storage area 317, in the data area of the address corresponding to the date/hour or the sequence number in the data areas Dt0 to Dtp of the accumulation area 319, in accordance with the date/hour (date and time) or the sequence number of the data. As a result, a series of the required detection value data are formed in the data areas Dt0 to Dtp, and finally supplied from the reader/writer 304 to the host computer.

Figure 8:
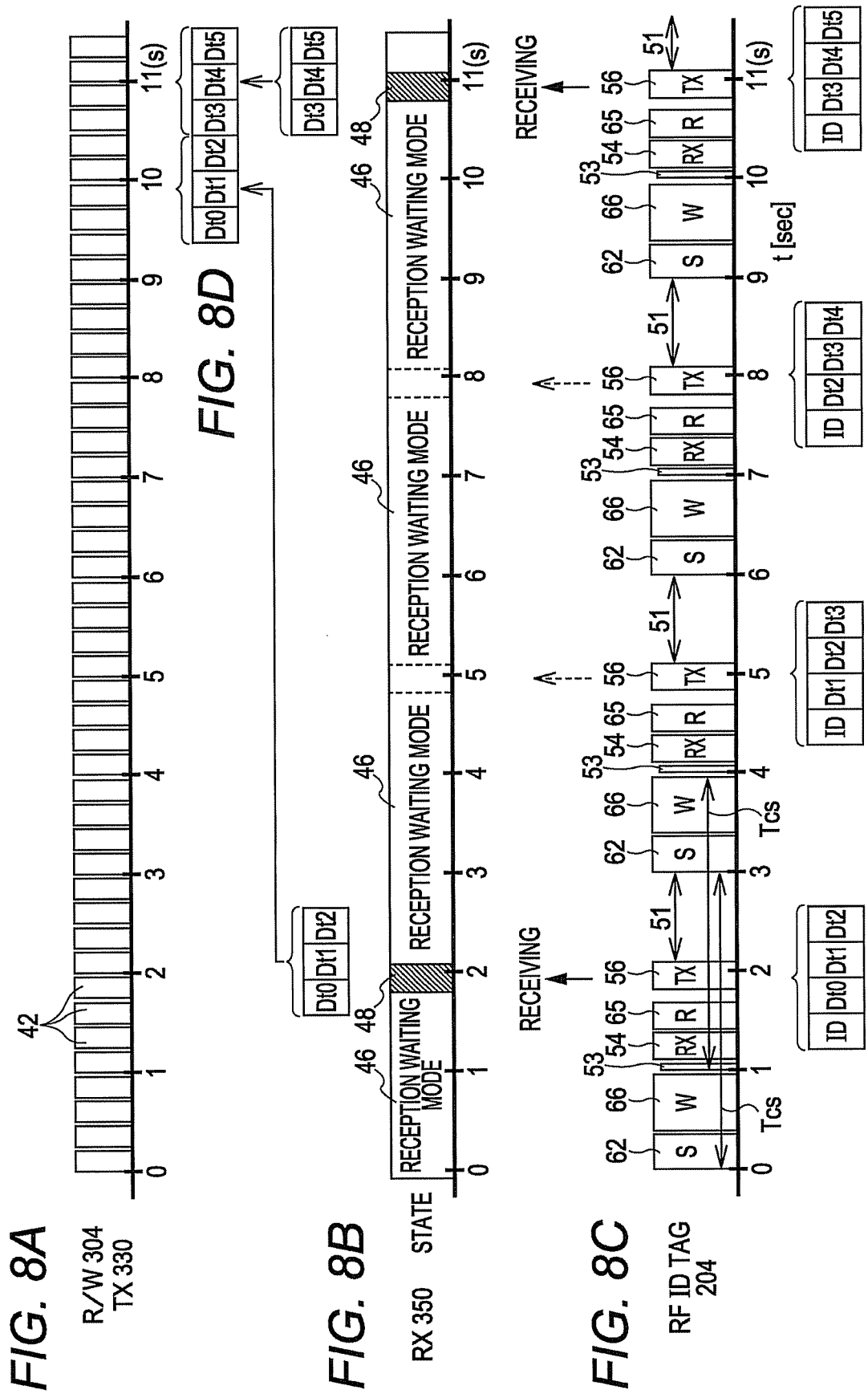
FIG. 8A illustrates an example of the time chart of the transmission process of the RF signal carrying the tag information request command (CMD) of the reader/writer.
FIG. 8B illustrates an example of the time chart of the receiving process of the RF signal and the reception waiting mode of the reader/writer.
FIG. 8C illustrates an example of the time chart of the carrier sense period of the active RF-ID tag, the detection of physical quantities, the read and write operation of the detection value from and into a memory, the receiving process of the RF signal, the read operation of the accumulated detection value data from the memory and the transmission process of the RF signal carrying the data containing the tag information such as the tag ID or the response data.
FIG. 8D illustrates an example of a series of detection value data interpolated or compensated by coupling in the reader/writer.

FIG. 8A illustrates an example of the time chart of the transmission process 42 of the RF signal carrying the tag information request command (CMD) of the reader/writer 304. FIG. 8B illustrates an example of the time chart of the reception waiting mode 46 and the RF signal receiving process 48 of the reader/writer 304. FIG. 8C illustrates an example of the time chart of the carrier sense operation 53 of the active RF-ID tag 204, the detection of physical quantities, the detection value data read operation 62 and the detection value write operation 66 from and into the memory 214, the RF signal receiving process 54, the accumulated detection value data read operation 65 from the memory 214, and the transmission process 56 of the RF signal carrying the data including the tag information such as the tag ID or the response data. FIG. 8D illustrates an example of the series of the detection value data Dt0 to Dt5 coupled and interpolated or compensated in the reader/writer 304.

Referring to FIG. 8A, the data generating unit 322 of the reader/writer 304 generates the data including the detection value data read request command as a tag information request command to the RF-ID tag received from the control unit 310. The data generating unit 322 encrypts the data in accordance with a predetermined encryption scheme, encodes the encrypted data in accordance with a predetermined coding scheme, and thus generates the encoded encryption data. The transmission unit 330 periodically transmits, at sufficiently short intervals, the RF signal carrying the command in each of continuous time slots of the transmission process 42.

Referring to FIG. 8C, in the active RF-ID tag 204, the control unit 210 generates, at predetermined periods Tcs (for example, 3 seconds), the wakeup signal from the wakeup unit 270. In the time zone 62 having the length of 100 ms, for example, the control unit 210 enables the sensor 286 and the data reader 288 thereby to capture the detection value data by causing the sensor 286 to detect the physical quantity or the state at periods Tcs. The control unit 210, during the succeeding time zone 66, enables the memory control unit 276 and the memory 214 to thereby accumulate the detection value data thereof in the detection data memory area 216 of the memory 214. The memory control unit 276 controls the detection data memory area 216 to hold the N detection value data D0 to D(N−1) in the predetermined number N (N: integer not less than 2) of the latest (most recent) data areas S0 to S(N−1). The old data may be destroyed or the newer data may be overwritten on the older data.

On the other hand, the control unit 210 enables the receiving unit 250 and the carrier judging unit 246 in the time zone 53 generated at the period Tcs of the wakeup signal. The RF-ID tag 204 causes the receiving unit 250 and the carrier judging unit 246 to perform the carrier sense operation of the received RF signal of frequency $f_1$ in the time zone 54 at the period Tcs. The length of this period Tcs may be set or changed in accordance with the period setting request command from the reader/writer 304. The detection period of the physical quantity or the state may not be equal to the carrier sense period Tcs.

Once the RF-ID tag 204 is arranged in the communicable range of the reader/writer 304 in the neighborhood thereof, the carrier of the RF signal from the reader/writer 304 is repeatedly detected by the RF-ID tag 204. The receiving unit 250 and the data decoding unit 242 are enabled for a predetermined duration of the succeeding time zone 54. The receiving unit 250 receives the RF signal, and by demodulating it, generates the encoded encryption data including the command. The data decoding unit 242 decodes the generated data in accordance with a predetermined coding scheme, decrypts it in accordance with a predetermined encryption scheme, and by thus retrieving the detection value data read request command, supplies it to the control unit 210.

In response to this command, the control unit 210 reads the file of a predetermined number N (for example, 3) of detection value data accumulated in the detection data memory area 216 of the memory 214. The control unit 210 encrypts, in accordance with a predetermined encryption scheme, the response data including the latest (most recent) N detection value data Dt0 to Dt(N−1), Dt1 to DtN, Dt0 to Dt(N+1) and so on (for example, groups of three including the data Dt0 to Dt2, Dt1 to Dt3 and Dt2 to Dt4) accumulated during the time zone in a predetermined period subsequently selected at random or in the time slot 56. The data thus encrypted are coded, and the RF signal of frequency $f_2$ carrying the coded data is transmitted back. The RF-ID tag 204 transmits, therefore, the predetermined number N of redundant detection value data Dt0 to Dt(N−1), Dt1 to DtN, Dt0 to Dt(N+1) and so on. In other words, the same data Dtj (j: integer) is typically transmitted N times.

During the dormant period 51 between the time zone 56 and the time zone 62, the RF-ID tag 204 enters the dormant mode, and only the control unit 210 and the wakeup unit 270 are enabled or powered on, while the other component elements are disabled or powered down.

Referring to FIG. 8B, the receiving unit 350 of the reader/writer 302 is always in the reception waiting mode. In the case where the RF-ID tag 204 receives the RF signal, the received RF signal is demodulated thereby to generate the encoded encryption data in the time zone of the receiving process 48. The data decoding unit 342 decodes the encoded encryption data in accordance with a predetermined encoding scheme. The data decoding unit 342 decrypts the encoded data in accordance with a predetermined encryption scheme thereby to reproduce the response data including the tag ID and the detection value data, which are supplied to the control unit 310. The reader/writer 304, therefore, receives a predetermined number N of detection value data Dt0 to Dt(N−1), Dt1 to DtN, Dt0 to Dt(N+1) and so on, i.e. the redundant detection value data each time. In response to the response data thus received and reproduced, the control unit 310 and the memory control unit 376 accumulate the detection value data for the tag ID in the accumulation area 319. The control unit 310 supplies a series of the accumulated detection value data for the tag ID to the host computer. The host computer processes the tag ID and the series of the detection value data, which are then used for monitoring and managing the commodity distribution or persons.

Depending on the environment of electromagnetic wave propagation, the transmitted response data Dtj to Dt(j+N−1) (for example, Dt1 to Dt3, Dt2 to Dt4) may be dropped off without being successfully received or decoded by the reader/writer 304 with a certain degree of probability as illustrated by dashed line in FIG. 8B. As illustrated in FIG. 8D, however, the reader/writer 304 (the memory control unit 376) can compensate for or interpolate the drop-off detection valve data by accumulating and coupling plural redundant detection value data received. Even in the case where the detection value data drop-off a maximum of N−1 times in a row, therefore, a series of original detection value data can be restored in accordance with the sequence of the date/hour tj of the received data by coupling the plural redundant detection value data successfully received.

Figure 9:
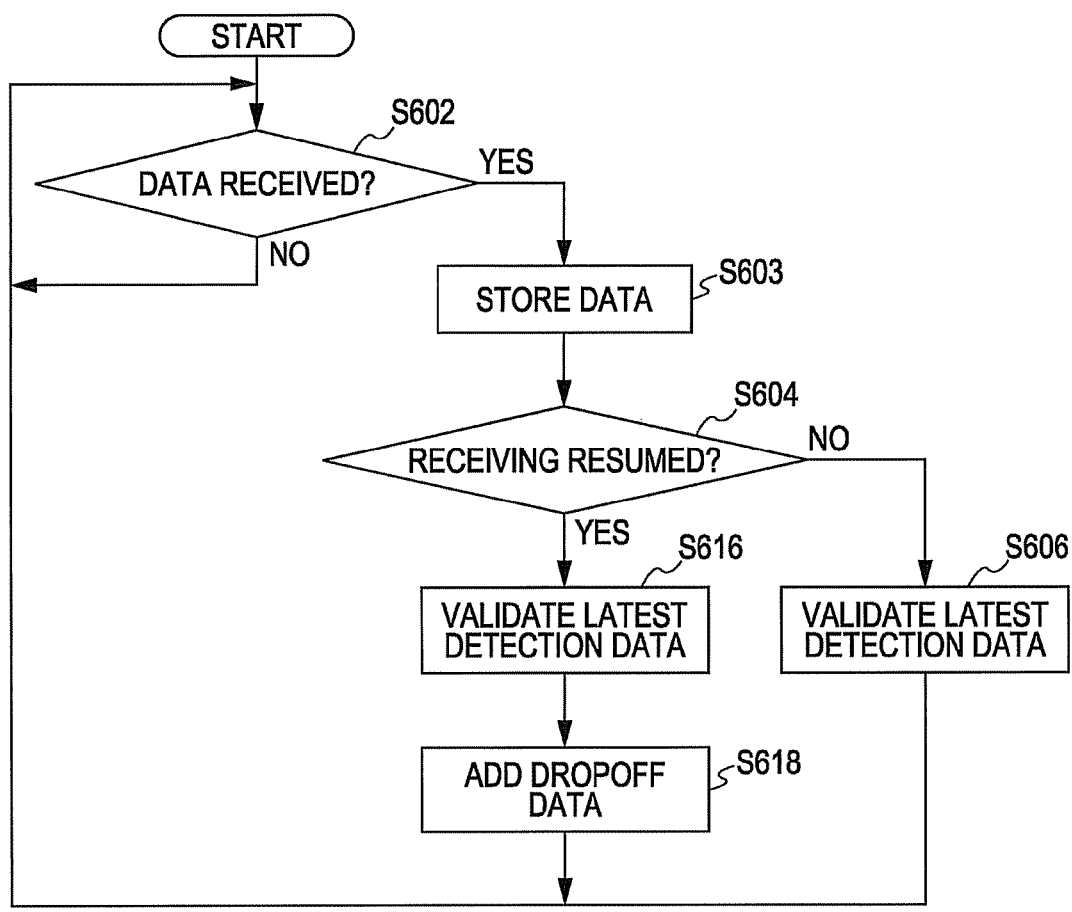
FIG. 9 illustrates an example of the operation flow of the process executed by the control unit and/or the memory control unit of the reader/writer to store a series of the received detection value data in the accumulation area of the memory.

FIG. 9 illustrates the operation flow of the process executed by the control unit 310 and the memory control unit 376 of the reader/writer 304 to store a series of the received detection value data Dtj to Dt(j+N−1) in the accumulation area 319 of the memory 314.

Referring to FIG. 9, the control unit 310 judges in the operation S601 based on the decoded data from the decoding unit 342 whether the new detection value data is received or not from the RF-ID tag. Until the new detection value data is received, the operation S602 is repeated. Upon judgment that the new detection value data is received, the control unit 310 stores N detection value data in the provisional storage area 317 (data areas S0 to S(N−1)) of the memory 314 in the operation S604 (not illustrated). In the operation S604, the memory control unit 376 judges whether the particular detection value data is received by resumption of the receive operation after the data drop-off, in accordance with the judgment result from the data drop-off judging unit 387.

The data drop-off judging unit 387 judges whether any data drop-off exists between the latest detection value data received in the preceding and present sessions based on the date and time thereof or not. Also, the data drop-off judging unit 387 may judge, based on the date and time of the preceding latest one detection value data, that a data drop-off exists in the case where the latest N detection value data are not received at the date and time in the scheduled period.

Upon judgment in the operation S604 that the detection value data is not received by the resumption of the receive operation, i.e. that no drop-off exists in the preceding session, the memory control unit 376 validates, in the operation S606, the latest (most recent) one detection value data stored in the provisional storage area 317 and writes it in the data area Dtj (j: integer of 0 to p) at the corresponding time tj in the accumulation area 319.

Upon judgment in the operation S604 that the detection value data is received by the resumption of the receive operation, i.e. that the data drop-off occurred in the preceding session, the memory control unit 376 validates, in the operation S616, the latest one detection data (data area S0) stored in the provisional storage area 317. Then, the validated data is written in the data area Dtj (j: 0 to p) at the corresponding time tj in the accumulation area 319, and in the operation S618, written in the data area Dtj' (j: (j+1) to (j+N−1)) corresponding to the time of the drop-off data in the accumulation area 319 using another N−1 detection value data (data areas S(j+1) to S(j+N−1)). After that, the process is returned to the operation S602.

Figure 10:
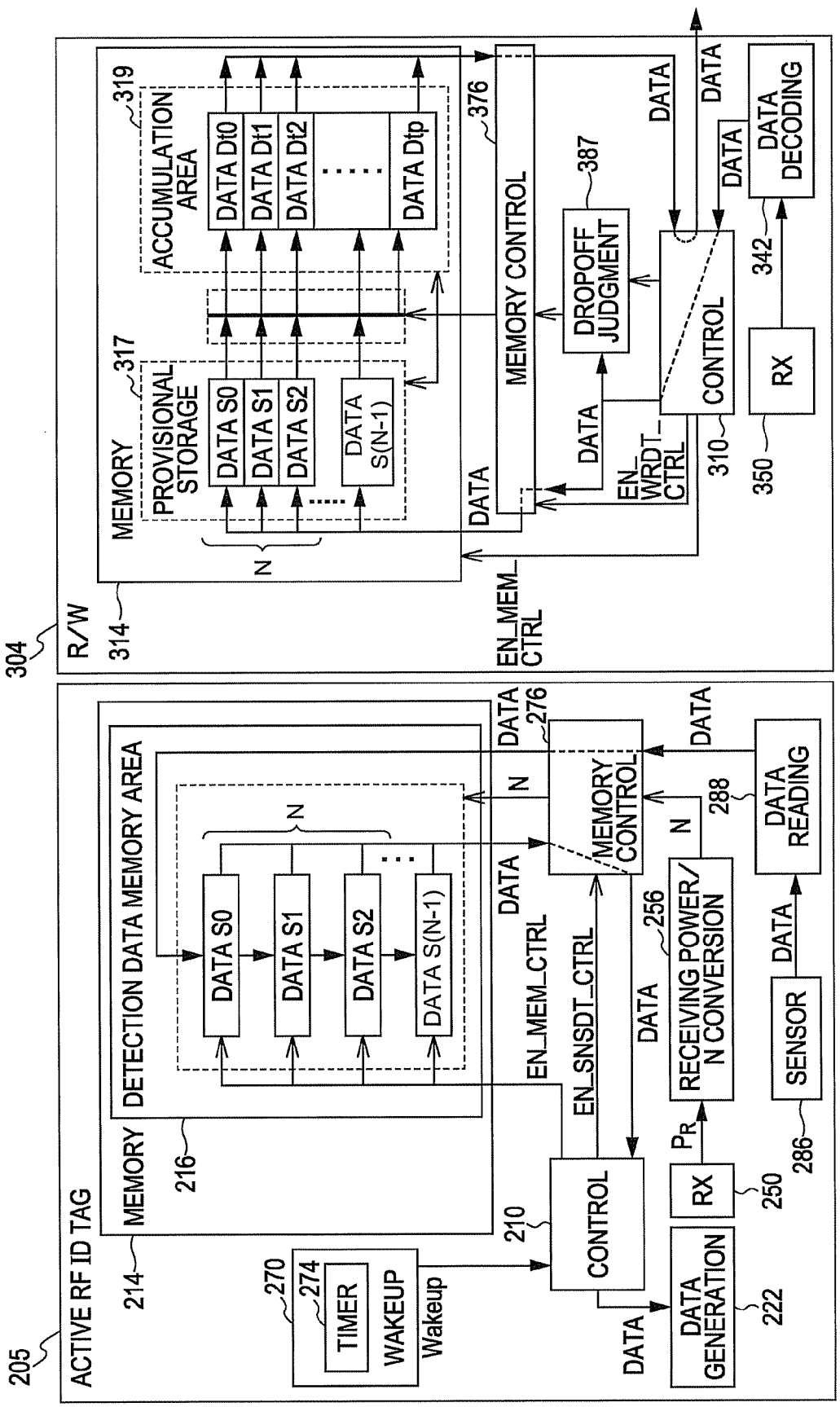
FIG. 10 illustrates an example of the configuration of only the related parts of the reader/writer and the active RF-ID tag as an active non-contact information storage unit according to another embodiment of the invention.

FIG. 10 illustrates the configuration of only the related parts of the active RF-ID tag 205 and the reader/writer 304 as an active non-contact information storage unit according to another embodiment of the invention.

Referring to the left side of FIG. 10, the RF-ID tag 205 has a receiving power/N conversion unit 256. The receiving power/N conversion unit 256 may be a part of the control unit 210. The receiving power/N conversion unit 256 receives the power intensity or level PR of the received RF signal from the receiving unit 250, processes it with respect to a threshold value, determines the corresponding number N thereof, and supplies the number N to the memory control unit 276. The memory control unit 276, in accordance with the number N, variably sets the number N of the data areas S0 to S(N−1) in the data memory area 216. The configuration of the other parts of the RF-ID tag 205 is similar to that of the RF-ID tag 204.

Referring to the right side of FIG. 10, the memory control unit 317 of the reader/writer 304 variably sets the number N of the data areas S0 to S(N−1) in accordance with the number N of a series of detection value data received. The configuration of the other parts of the reader/writer 304 is similar to the configuration illustrated in FIG. 7.

FIG. 11A illustrates an example of the time chart of the transmission process 42 of the RF signal carrying the tag information request command (CMD) of the reader/writer 304. FIG. 11B illustrates an example of the time chart of the reception waiting mode 46 and the receiving process 48 of the RF signal of the reader/writer 304. FIG. 11C illustrates an example of the time chart of the carrier sense operation 53 of the active RF-ID tag 205, the detection of the physical quantity, the detection value data read operation 62 and the write operation 66 into the memory 214, the RF signal receiving process 54, the read operation of the accumulated detection value data from the memory 214 and the transmission process 56 of the RF signal carrying the data containing the tag information such as the tag ID or the response data. FIG. 11D illustrates an example of the receiving power level PR of the RF signal in the active RF-ID tag 205.

The time chart of FIG. 11A is similar to that of FIG. 8A.

Referring to FIG. 11C, the control unit 210, in the active RF-ID tag 205, like in the case of FIG. 8C, enables the sensor 286 and the data reader 288 during the period 62 at the period Tcs and thus captures the detection value data. Then, the control unit 210 enables the memory control unit 276 and the memory 214 in the succeeding time 66 and accumulates the detection value data in the detection data memory area 216 of the memory 214.

The memory control unit 276 controls the detection data memory area 216 in accordance with the number N from the receiving power/N conversion unit 256 and variably sets the number N of the detection value data S0 to S(N−1) in the detection data memory area 216. The memory control unit 276, in accordance with the number N thus set, holds at least the N latest detection value data S0 to S(N−1) in the detection data memory area 216 for transmission.

The control unit 210, on the other hand, like in the case of FIG. 8C, enables the receiving unit 250 and the carrier judging unit 246 in the time zone 53. The RF-ID tag 205 causes the receiving unit 250 and the carrier judging unit 246 to carry out the carrier sense operation of the received RF signal of frequency $f_1$ in the time zone 53 at the period Tcs.

The receiving unit 250 and the data decoding unit 242 are enabled in a predetermined duration in the succeeding time zone 54. The receiving unit 250 detects the receiving power level PR of the RF signal of frequency $f_1$ during the time zones 53 and 54 and supplies it to the receiving power/N conversion unit 256.

In the case where the receiving power level PR from the receiving unit 250 is larger than the threshold value $P_{TH}$, the receiving power/N conversion unit 256 determines the number N at a predetermined small value Ns (for example, 3), while in the case where the receiving power level PR is not higher than the threshold value, determines the number N at a predetermined large value Nl (for example, 6). The receiving power/N conversion unit 256 may determine the values of the different numbers N1, N2, . . . , Nm in accordance with the value of the receiving power level PR using plural threshold values. The memory control unit 276, in accordance with the number N from the receiving power/N conversion unit 256, determines the number N of the detection value data transmitted in the detection data memory area 216.

Referring to FIG. 11C, the receiving power level PR is first higher than the threshold value $P_{TH}$ and the number N is set at 3, so that the three detection value data Dt2 to Dt4 are transmitted. After that, the receiving power level PR is reduced below the threshold value $P_{TH}$ and N is set at 6, so that six detection value data Dt0 to Dt5 and Dt1 to Dt6 are transmitted twice. After that the receiving power level PR is increased beyond the threshold value $P_{TH}$ and N is set at 3, so that the three detection value data Dt5 to Dt7 are transmitted.

As described above, the RF-ID tag 205 illustrated in FIG. 10 transmits the detection value data high in redundancy in the adverse environment of electromagnetic wave propagation of the RF signal, and transmits the detection value data low in redundancy in the favorable environment of electromagnetic wave propagation. The other operation of the RF-ID tag 205 in FIG. 11C is similar to the corresponding operation in FIG. 8C.

FIG. 11B is similar to FIG. 8B. The memory control unit 314 of the reader/writer 304, operating in a similar manner to the case of FIG. 8B, interpolates the drop-off data and forms a series of detection value data interpolated or compensated by coupling.

In accordance with the environment of electromagnetic wave propagation, the RF-ID tag 205 illustrated in FIG. 10 adjusts the number N of the detection data transmitted. In the adverse environment of electromagnetic wave propagation where the data drop-off is liable to occur, therefore, the RF-ID tag 205 transmits a greater number of detection value data, so that the drop-off data can be compensated or interpolated by the reader/writer 304 based on the greater number of detection value data. In the favorable environment of electromagnetic wave propagation, therefore, the power consumption of the battery 290 of the RF-ID tag 205 can be reduced by shortening the length of the transmission data or the transmission time.

Figure 12A:
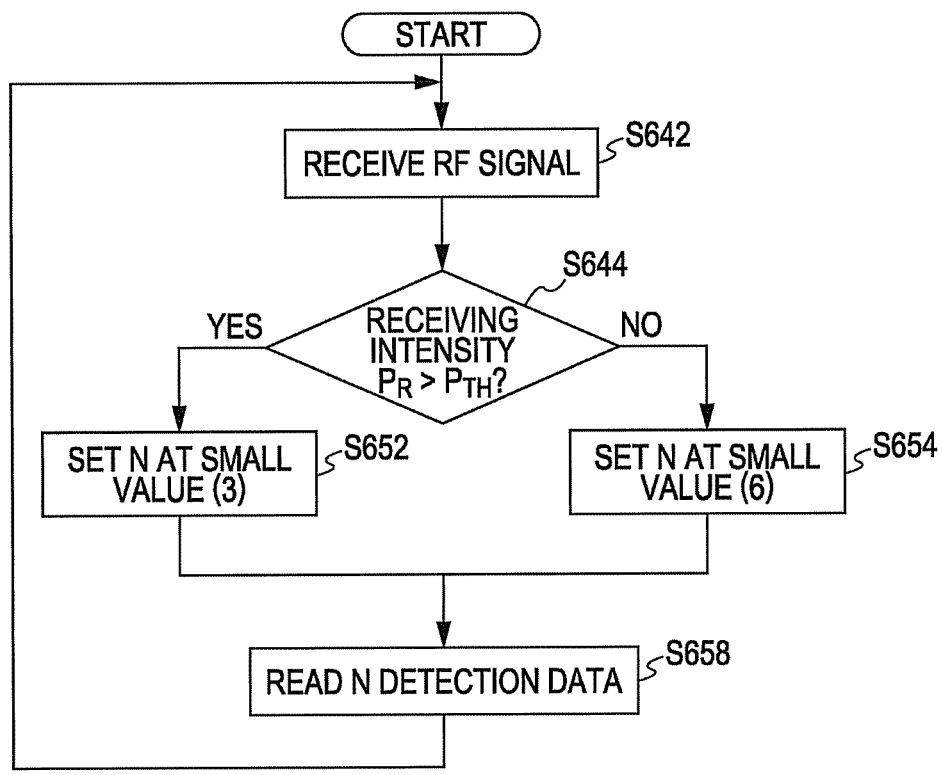
FIG. 12A illustrates an example of the operation flow executed by the RF-ID tag to determine the number N of a series of plural detection value data to be transmitted in accordance with the receiving power level.
Figure 12B:
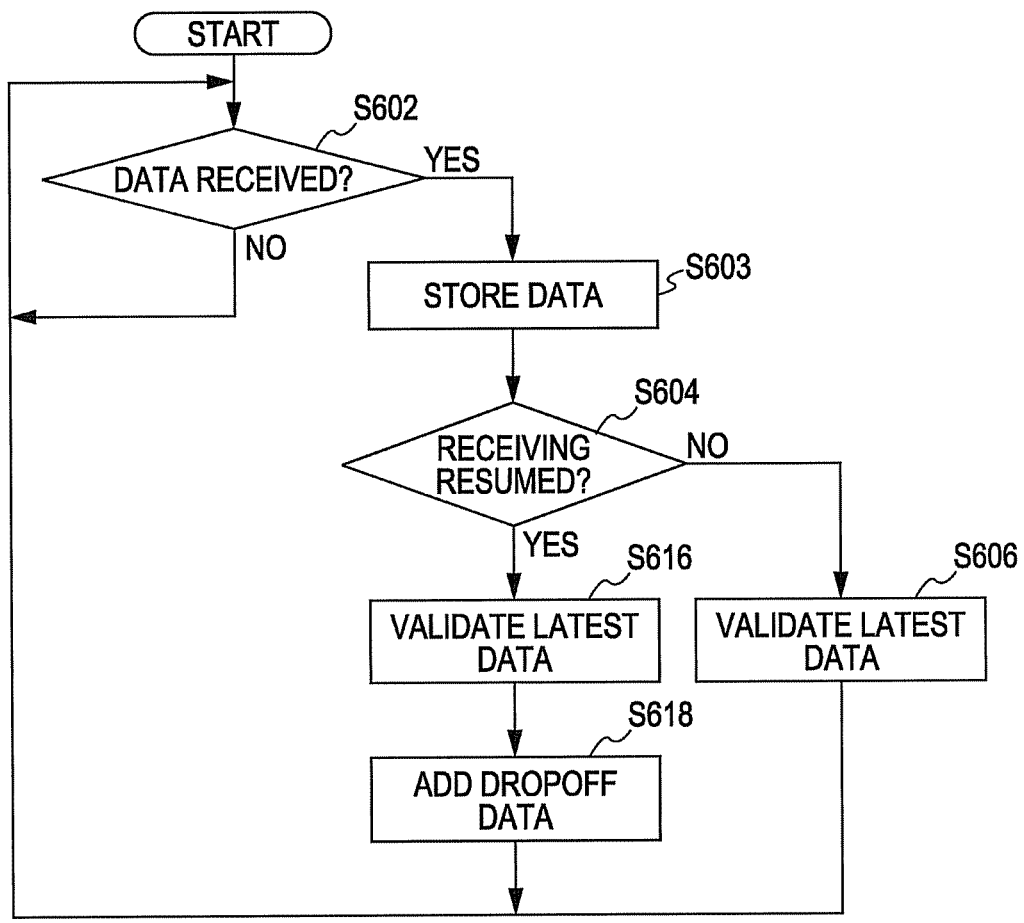
FIG. 12B illustrates an example of the operation flow of the process executed by the control unit and/or the memory control unit of the reader/writer to store a series of the received detection value data in the accumulation area of the memory.

FIG. 12A illustrates an example of the operation flow executed by the RF-ID tag 205 to determine the number N of the series of plural detection value data S0 to S(N−1) to be transmitted in accordance with the receiving power level PR. FIG. 12B illustrates an example of the operation flow executed by the control unit 310 and/or the memory control unit 376 of the reader/writer 304 to store a series of received detection value data Dt0 to Dtp in the accumulation area 319 of the memory 314.

Referring to FIG. 12A, the receiving unit 250 of the RF-ID tag 205 receives the RF signal and detects the receiving power level PR of the RF signal in the operation S622. In the operation S624, the receiving power/N conversion unit 256 compares the receiving power level PR with the threshold value $P_{TH}$, and judges whether the receiving power level PR is higher than the threshold value $P_{TH}$ or not. Upon judgment that the power level PR is higher than the threshold value $P_{TH}$, the receiving power/N conversion unit 256 determines, in the operation S632, the number N of the transmitted detection value data at a small value Ns (for example, 3). The receiving power/N conversion unit 256 may determine the different numbers N1, N2, . . . , Nm in accordance with the value of the receiving power level PR using plural different threshold values.

Upon judgment in the operation S624 that the power level PR is not higher than the threshold value $P_{TH}$, the receiving power/N conversion unit 256 determines, in the operation S634, a large value N1 (for example, 6) as the number N of the detection value data transmitted. In the operation S638, the memory control unit 276 reads the N detection value data thus determined, from the detection data area 216 and supplies the control unit 210 for transmission. After that, the process returns to the operation S622.

The operation flow of the reader/writer 304 illustrated in FIG. 12B is similar to that of FIG. 9.

Figure 13:
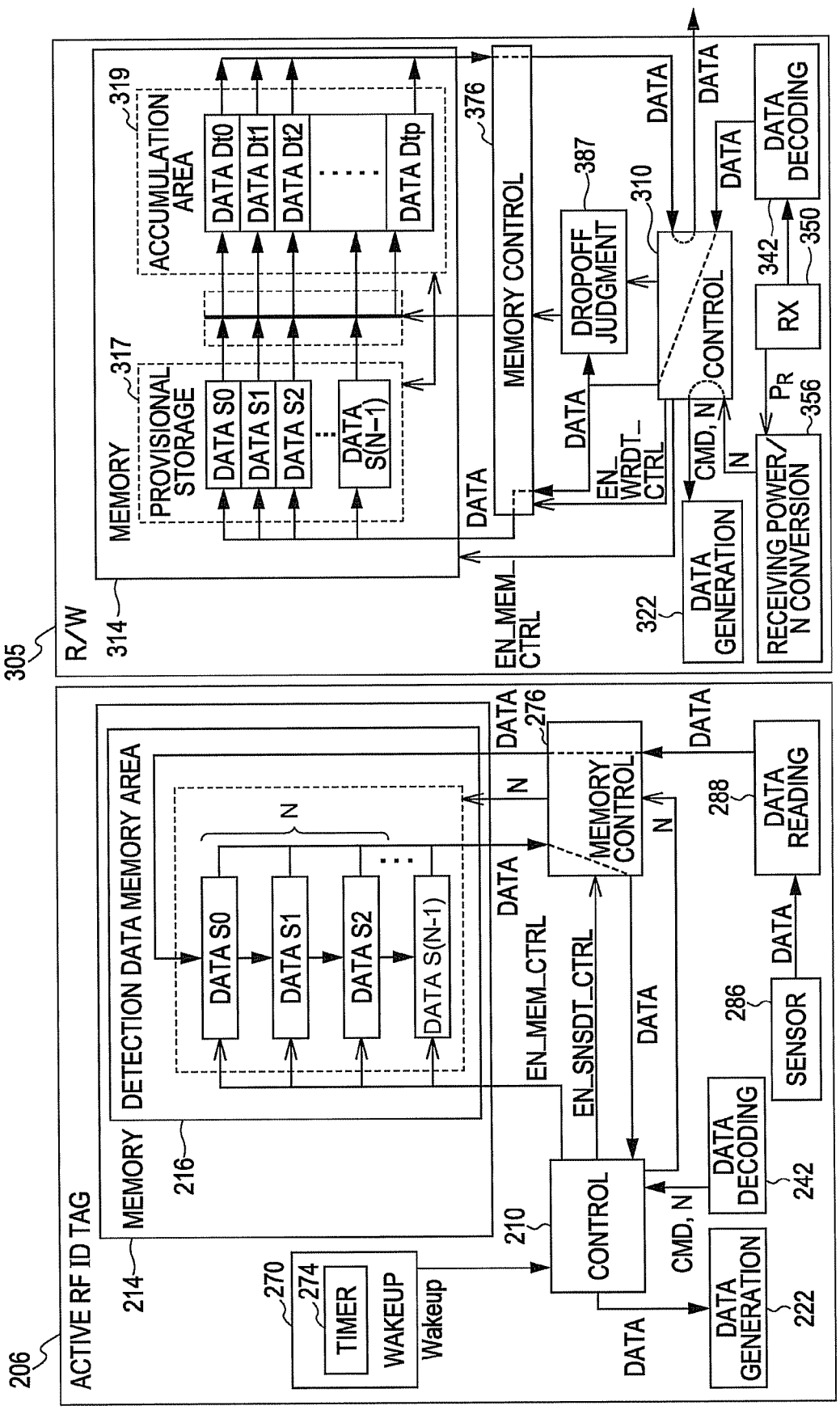
FIG. 13 illustrates an example of the configuration of only the related parts of the reader/writer and the active RF-ID tag as an active non-contact information storage unit according to still another embodiment of the invention.

FIG. 13 illustrates the configuration of only the related parts of the reader/writer 305 and the active RF-ID tag 206 as an active non-contact information storage unit according to still another embodiment of the invention.

Referring to the right side of FIG. 13, the reader/writer 305 has a receiving power/N conversion unit 356. The receiving power/N conversion unit 356 may be a part of the control unit 310. The receiving power/N conversion unit 356 receives the power intensity or level PR of the receiving response RF signal from the RF-ID tag 206, processes the RF signal with respect to a threshold value. The receiving power/N conversion unit 356 determines the corresponding number N and supplies the number N to the control unit 310. The control unit 310 generates the detection data request command containing the number N and supplies it to the data generating unit 322. The other parts of the configuration of the reader/writer 305 are similar to that of the reader/writer 304 illustrated in FIG. 7.

Referring to the left side of FIG. 13, the control unit 210 in the RF-ID tag 206 retrieves the number N of the detection value data to be transmitted, from the received command, and supplies it to the memory control unit 276. The memory control unit 276 variably sets the number N of the data areas S0 to S(N−1) in the provisional storage area 317 in accordance with the number N. The configuration of the other parts of the RF-ID tag 206 is similar to that of the RF-ID tag 204 in FIG. 7 or the RF-ID tag 205 in FIG. 10.

FIG. 14A illustrates an example of the time chart for the transmission process 42 of the RF signal carrying the tag information request command (CMD) of the reader/writer 305. FIG. 14B illustrates an example of the receiving power level PR of the RF signal in the reader/writer 305. FIG. 14C illustrates an example of the time chart for the receiving process 48 of the RF signal and the reception waiting mode 46 of the reader/writer 305. FIG. 14D illustrates an example of the time chart of the carrier sense operation 53 of the active RF-ID tag 206, the detection of the physical quantity, the detection value data read operation 62 and the write operation 66 into the memory 214, the RF signal receiving process 54, the read operation 65 of the accumulated detection value data from the memory 214 and the transmission process 56 of the RF signal carrying the data containing the tag information such as the tag ID or the response data.

Referring to FIG. 14A, the data generating unit 322 of the reader/writer 306 reads the detection value data including the number N of the data detection values received from the control unit 310 and to be transmitted, generates and encrypts the data including the read request command, encodes the encrypted data and generates the encrypted data from the data thus encoded. The other operation of the reader/writer 306 in FIG. 14A is similar to that of FIG. 8A.

Referring to FIG. 14D, the data decoding unit 242 of the RF-ID tag 206 retrieves the number N of the data detection value to be transmitted, from the received command, and supplies it to the memory control unit 276. The memory control unit 276 controls the detection data memory area 216 in accordance with the number N, variably sets the number N of the detection value data S0 to S(N−1) in the detection data memory area 216. In accordance with the particular number N, the memory control unit 276 retrieves only the latest N detection value data S0 to S(N−1) for transmission.

FIG. 14C is similar to FIG. 11B. The memory control unit 314 of the reader/writer 304 operates in the same manner as in FIG. 8B thereby to interpolate the drop-off data and form a series of detection value data interpolated or compensated by coupling.

Referring to FIG. 14B, the receiving unit 250 in the reader/writer 304 detects the receiving power level PR of the response RF signal of frequency $f_2$ in the time zone 48 and supplies it to the receiving power/N conversion unit 356.

In the case where the receiving power level PR from the receiving unit 350 is larger than the threshold value $P_{TH}$, the receiving power/N conversion unit 356 determines the number N at a predetermined small value Ns (for example, 3), while in the case where the receiving power level PR is not higher than the threshold value, determines the number N at a predetermined large value Nl (for example, 6). The receiving power/N conversion unit 356 may determine the values of the different numbers N1, N2, . . . , Nm in accordance with the value of the receiving power level PR using plural different threshold values.

The control unit 310 generates the command including, as the number of the detection value data to be transmitted, the number N from the receiving power/N conversion unit 256. The control unit 310 supplies the generated command to the data generating unit 322. Therefore, as explained with reference to FIG. 14A, the data generating unit 322 reads the detection value data including the number N and generates the data including the request command, so that the transmission unit 350 transmits the RF signal carrying the particular data.

Referring to FIG. 14D, the number N of the detection value data to be transmitted in response to the received command is first set at 3 and three detection value data Dt2 to Dt4 are transmitted. After that, the number N of the detection value data to be transmitted is set at 6, so that six detection value data Dt0 to Dt5 and Dt1 to Dt6 are transmitted twice. After that, the number N of the detection value data to be transmitted is set at 3.

The reader/writer 305 illustrated in FIG. 13 adjusts the number N of the detection value data to be transmitted, in accordance with the environmental situation of electromagnetic wave propagation. In the adverse environment of electromagnetic wave propagation where the data drop-off is liable to occur, the reader/writer 305 transmits a greater number of detection value data to the RF-ID tag 206, so that the drop-off data can be compensated or interpolated by the reader/writer 305 based on a greater number of detection value data. In the favorable environment of electromagnetic wave propagation, therefore, the power consumption of the battery 290 of the RF-ID tag 206 can be reduced by shortening the length of the transmission data or the transmission time.

Figure 15A:
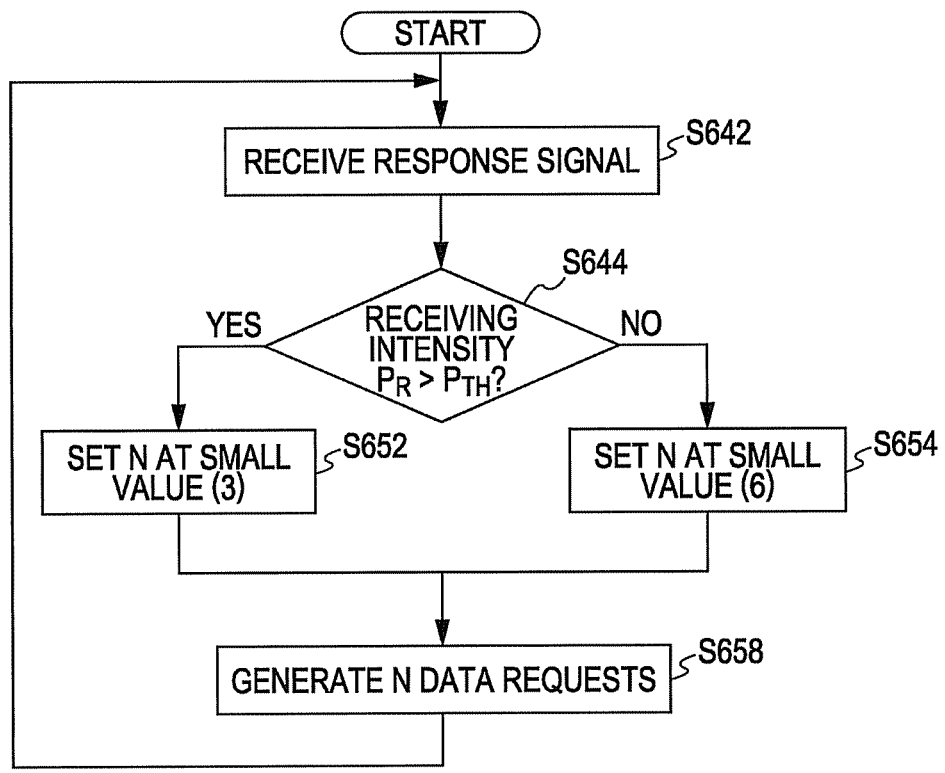
FIG. 15A illustrates an example of the operation flow of the process executed by the reader/writer to determine the number N of a series of plural detection value data to be transmitted in accordance with the receiving intensity.
Figure 15B:
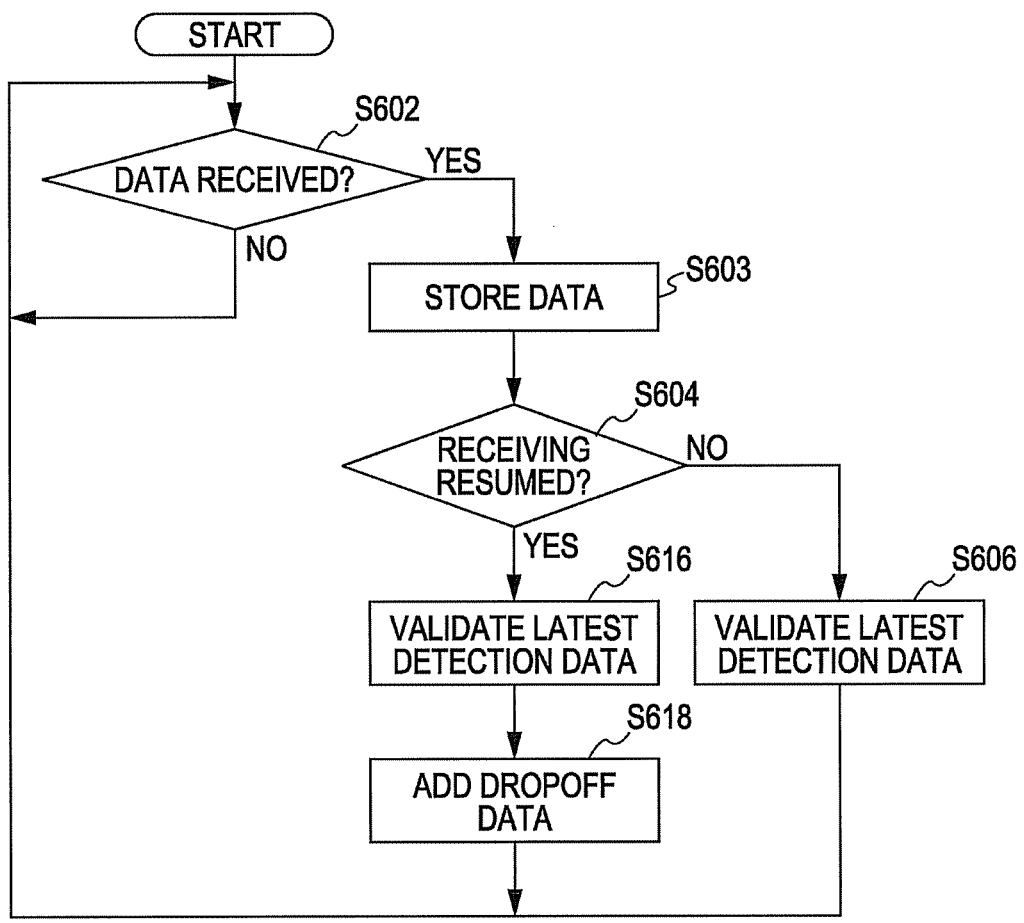
FIG. 15B illustrates an example of the operation flow of the process executed by the control unit and/or the memory control unit of the reader/writer to store a series of the received detection value data in the accumulation area of the memory.

FIG. 15A illustrates an example of the operation flow executed by the reader/writer 305 to determine the number N of a series of plural detection value data S0 to S(N−1) to be transmitted in accordance with the receiving intensity. FIG. 15B illustrates an example of the operation flow executed by the control unit 310 and/or the memory control unit 376 of the reader/writer 305 to store a series of detection value data Dt0 to Dtp in the accumulation area 319 of the memory 314.

Referring to FIG. 15A, the receiving unit 350 of the reader/writer 305 receives the RF signal and detects the receiving power level PR of the RF signal in the operation S642. In the operation S644, the receiving power/N conversion unit 356 compares the receiving power level PR with the threshold value $P_{TH}$, and judges whether the receiving power level PR is higher than the threshold value $P_{TH}$ or not. Upon judgment that the power level PR is higher than the threshold value $P_{TH}$, the receiving power/N conversion unit 356 determines the number N of the detection value data transmitted at a small value Ns (for example, 3) in the operation S652. The receiving power/N conversion unit 356 may determine the different numbers N1, N2, ..., Nm in accordance with the value of the receiving power level PR using plural different threshold values.

Upon judgment in the operation S644 that the power level PR is not higher than the threshold value $P_{TH}$, the receiving power/N conversion unit 256 determines, in the operation S654, a large value Nl (for example, 6) as the number N of the detection value data transmitted. In the operation S658, the control unit 310 generates the detection data request command including the number N and supplies it to the data generating unit 322. After that, the process returns to the operation S642.

The operation flow of the reader/writer 305 illustrated in FIG. 15B is similar to that in FIG. 9.

Figure 16:
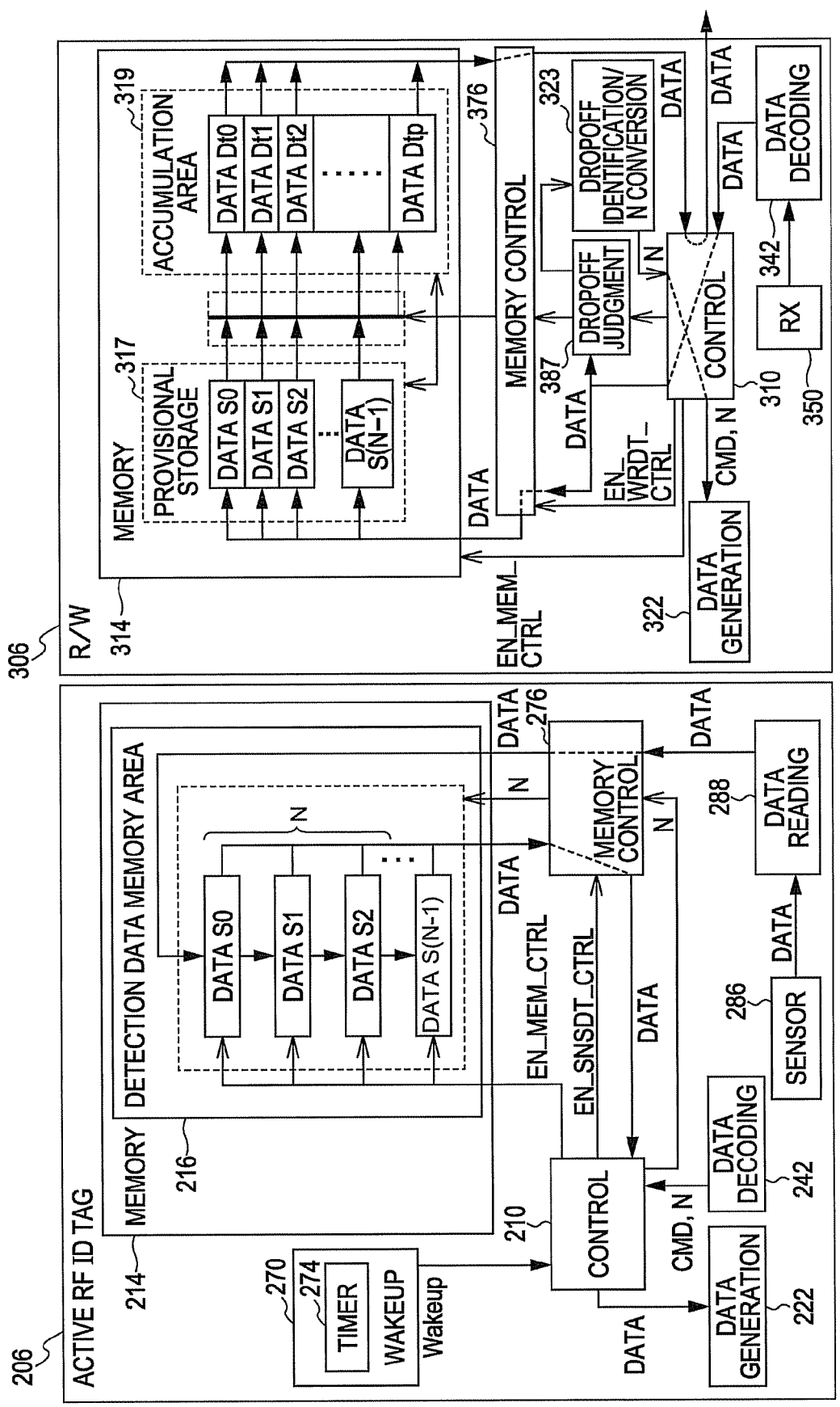
FIG. 16 illustrates an example of the configuration of only the related parts of the reader/writer and the active RF-ID tag as an active non-contact information storage unit according to yet another embodiment of the invention.

FIG. 16 illustrates an example of the configuration of only the related parts of the reader/writer 306 and the active RF-ID tag 206 as an active non-contact information storage unit according to yet another embodiment of the invention.

Referring to the right side of FIG. 16, the reader/writer 306 has a drop-off data identification/N conversion unit 323. The data drop-off judging unit 387 and the drop-off data identification/N conversion unit 323 may be a part of the control unit 310. The data drop-off judging unit 387 determines which detection value data has dropped off based on the date/hour or the sequence number of the received detection value data and judges the identification or the position of the drop-off data. The drop-off data identification/N conversion unit 323 receives the accumulative drop-off identification or the drop-off data position from the data drop-off judging unit 387. The drop-off data identification/N conversion unit 323 determines the corresponding number N, and supplies the number N to the control unit 310. The drop-off data identification/N conversion unit 323 may detect the drop-off of the detection value data in the accumulation area 319 and determine the corresponding number N. The number N is typically the sum (1+nL) of the constant 1 and the number nL of the drop-off data. The control unit 310 generates the detection data request command including the number N and supplies it to the data generating unit 322. The configuration of the other parts of the reader/writer 306 is similar to that of the reader/writer 305 illustrated in FIG. 13.

In FIG. 16, the configuration of the RF-ID tag 206 is similar to that illustrated in FIG. 13.

FIG. 17A illustrates an example of the time chart of the transmission process 42 of the RF signal carrying the tag information request command (CMD) of the reader/writer 306. FIG. 17B illustrates an example of the time chart of the reception waiting mode 46 and the RF signal receiving process 48 of the reader/writer 306. FIG. 17C illustrates an example of the time chart of the carrier sense operation 53 of the active RF-ID tag 206, the detection of the physical quantity, the detection value data read operation 62 and the write operation 66 into the memory 214, the RF signal receiving process 54, the read operation 65 of the accumulated detection value data from the memory 214 and the transmission process 56 of the RF signal carrying the data containing the tag information such as the tag ID or the response data.

Referring to FIG. 17A, the data generating unit 322 of the reader/writer 306 reads the detection value data including the number N of the data detection values received from the control unit 310 and to be transmitted. The data generating unit 322 generates and encrypts the data including the read request command, encodes the encrypted data and thus generates the encoded encryption data. The other operation of the reader/writer 306 in FIG. 17A is similar to that of FIG. 8A.

Referring to FIG. 17C, the data decoding unit 242 of the RF-ID tag 206 retrieves the number N of the data detection value to be transmitted, from the received command, and supplies it to the memory control unit 276. The memory control unit 276 controls the detection data memory area 216 in accordance with the number N, and variably sets the number N of the detection value data S0 to S(N−1) in the detection data memory area 216. The memory control unit 276, in accordance with the particular number N, retrieves only the latest N detection value data S0 to S(N−1) for transmission.

FIG. 17B is similar to FIG. 8B. The memory control unit 314 of the reader/writer 306, operating in a similar manner to the case of FIG. 8B, interpolates the drop-off data and forms a series of detection value data interpolated or compensated by coupling.

In the reader/writer 306, the receiving unit 250 and the data decoding unit 342 first receive and reproduce the detection value data Dt1 carried by the RF signal received from the RF-ID tag 206. The data drop-off judging unit 387 judges that no drop-off exists based on the date/hour t1 of the data Dt1. In the absence of data drop-off, the drop-off data identification/N conversion unit 323 determines the number N at 1. Thus, the control unit 310 generates the detection data request command including the number 1 and supplies it to the data generating unit 322. The reader/writer 306 transmits the RF signal carrying the detection data request command including the number N of 1.

In response to the reception of the command, the RF-ID tag 206 transmits the response RF signal carrying one detection value data Dt2.

The receiving unit 250 and the data decoding unit 342 of the reader/writer 306 fail to receive the RF signal from the RF-ID tag 206 and reproduce the data. The data drop-off judging unit 387 judges that there is one drop-off data for lack of data reception at the scheduled date/hour t2 or not. The drop-off data identification/N conversion unit 323 determines nL as 1 and the number N as (1+1=2). The reader/writer 306 transmits the RF signal carrying the detection data request command including the number N of 2.

In response to the reception of this command, the RF-ID tag 206 transmits the response RF signal carrying the two detection value data Dt2 and Dt3.

The receiving unit 250 and the data decoding unit 342 of the reader/writer 306 fail to receive the RF signal from the RF-ID tag 206 and reproduce the data. The data drop-off judging unit 387 judges that there are two pieces of accumulative drop-off data for lack of the reception of the detection value data at the scheduled date/hour t2 and t3 or not. The drop-off data identification/N conversion unit 323 determines nL as 2 and the number N as (1+2=3). The reader/writer 306 transmits the RF signal carrying the detection data request command including the number N of 3.

In response to the reception of this command, the RF-ID tag 206 transmits the response RF signal carrying the three detection value data Dt2 to Dt4.

In the reader/writer 306, the receiving unit 250 and the data decoding unit 342 receive and reproduce the three detection value data Dt2 to Dt4 carried by the RF signal received from the RF-ID tag 206. The data drop-off judging unit 387 judges that there is no accumulative drop-off data based on the date/hour t2 to t4 of the data Dt2 to Dt4. In the absence of the data drop-off, the drop-off data identification/N conversion unit 323 determines the number N at 1. The control unit 310 generates the detection data request command including the number N of 1 and supplies it to the data generating unit 322. The reader/writer 306 transmits the RF signal carrying the detection data request command including the number N of 1.

The RF-ID tag 206 transmits the response RF signal carrying one detection value data Dt5 in response to the reception of the command.

The reader/writer 306 in FIG. 16 adjusts the number N of the detection value data to be transmitted, in accordance with the number of continuous drop-off data reflecting the environmental condition of electromagnetic wave propagation. In the case where the environmental condition of electromagnetic wave propagation is so adverse that the data drop-off has occurred, the reader/writer 306 causes the RF-ID tag 206 to retransmit the drop-off detection value data so that the reader/writer 306 can compensate or interpolate the drop-off data. In the favorable environmental condition of electromagnetic wave propagation, therefore, the power consumption of the battery 290 of the RF-ID tag 206 can be reduced by shortening the length of the transmission data or the transmission time.

Figure 18A:
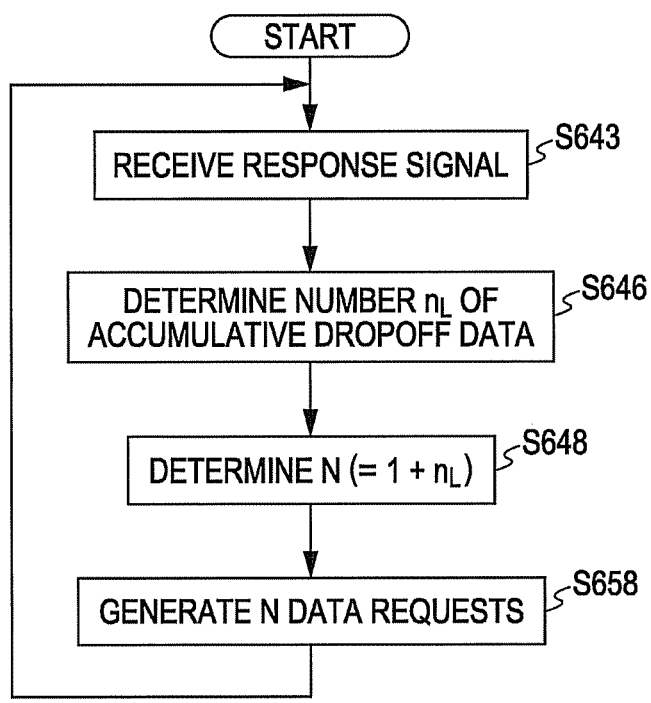
FIG. 18A illustrates an example of the operation flow of the process executed by the reader/writer to determine the number N of a series of plural detection value data to be transmitted in accordance with the number of drop-off data.
Figure 18B:
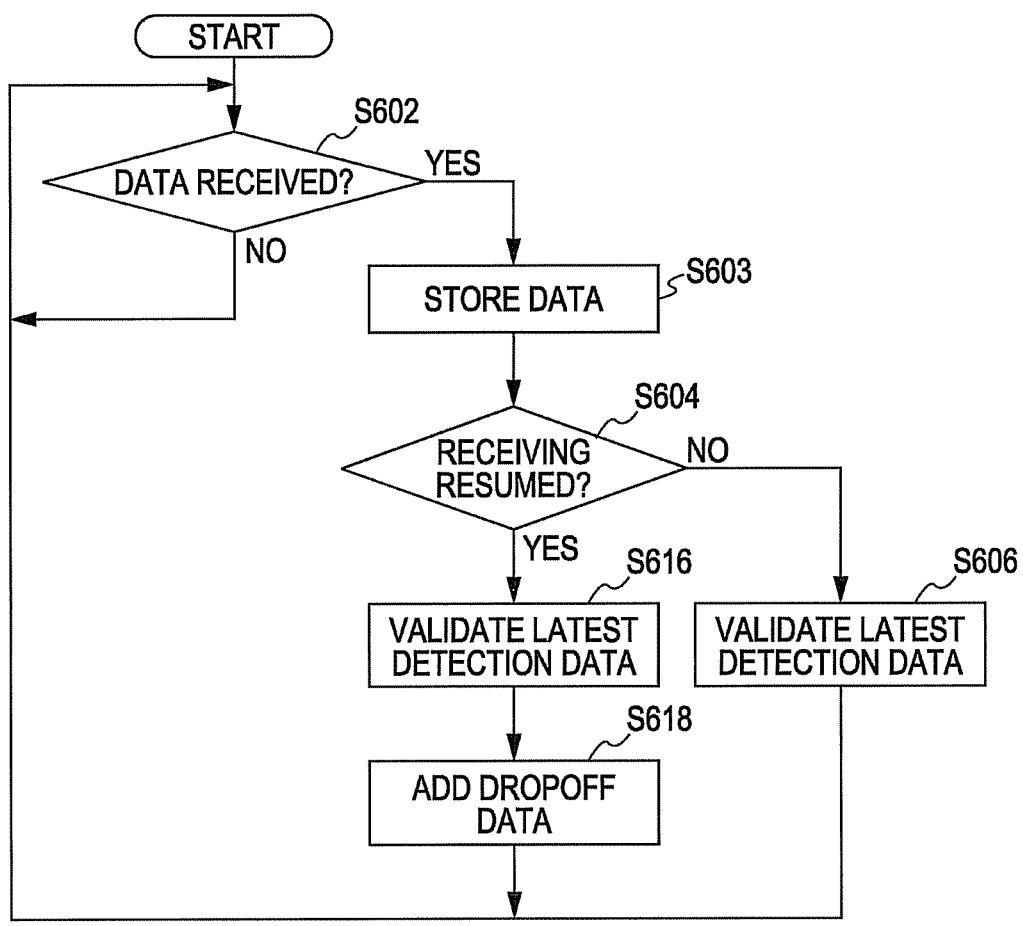
FIG. 18B illustrates an example of the operation flow of the process executed by the control unit and/or the memory control unit of the reader/writer to store a series of the received detection value data in the accumulation area of the memory.

FIG. 18A illustrates an example of the operation flow executed by the reader/writer 306 to determine the number N of a series of plural detection value data S0 to S(N−1) to be transmitted, in accordance with the number of continuous drop-off data. FIG. 18B illustrates an example of the operation flow of the process executed by the control unit 310 and/or the memory control unit 376 of the reader/writer 306 to store a series of received detection value data Dt0 to Dtp in the accumulation area 319 of the memory 314.

Referring to FIG. 18A, the receiving unit 250 of the RF-ID tag 206 receives the RF signal in the operation S643. In the operation S646, the data drop-off judging unit 387 judges the identification or position of the drop-off data and the drop-off data identification/N conversion unit 323 determines the continuous number nL of the accumulative drop-off data identification or the drop-off data position. In the operation S648, the drop-off data identification/N conversion unit 323 determines the number N (=1+nL) of the detection value data to be transmitted, based on the number nL. In the operation S658, the control unit 310 generates the detection value data request command including the number N and supplies it to the data generating unit 322. After that, the process returns to the operation S643.

The operation flow of the reader/writer 306 illustrated in FIG. 18B is similar to that of FIG. 9.

Figure 19:
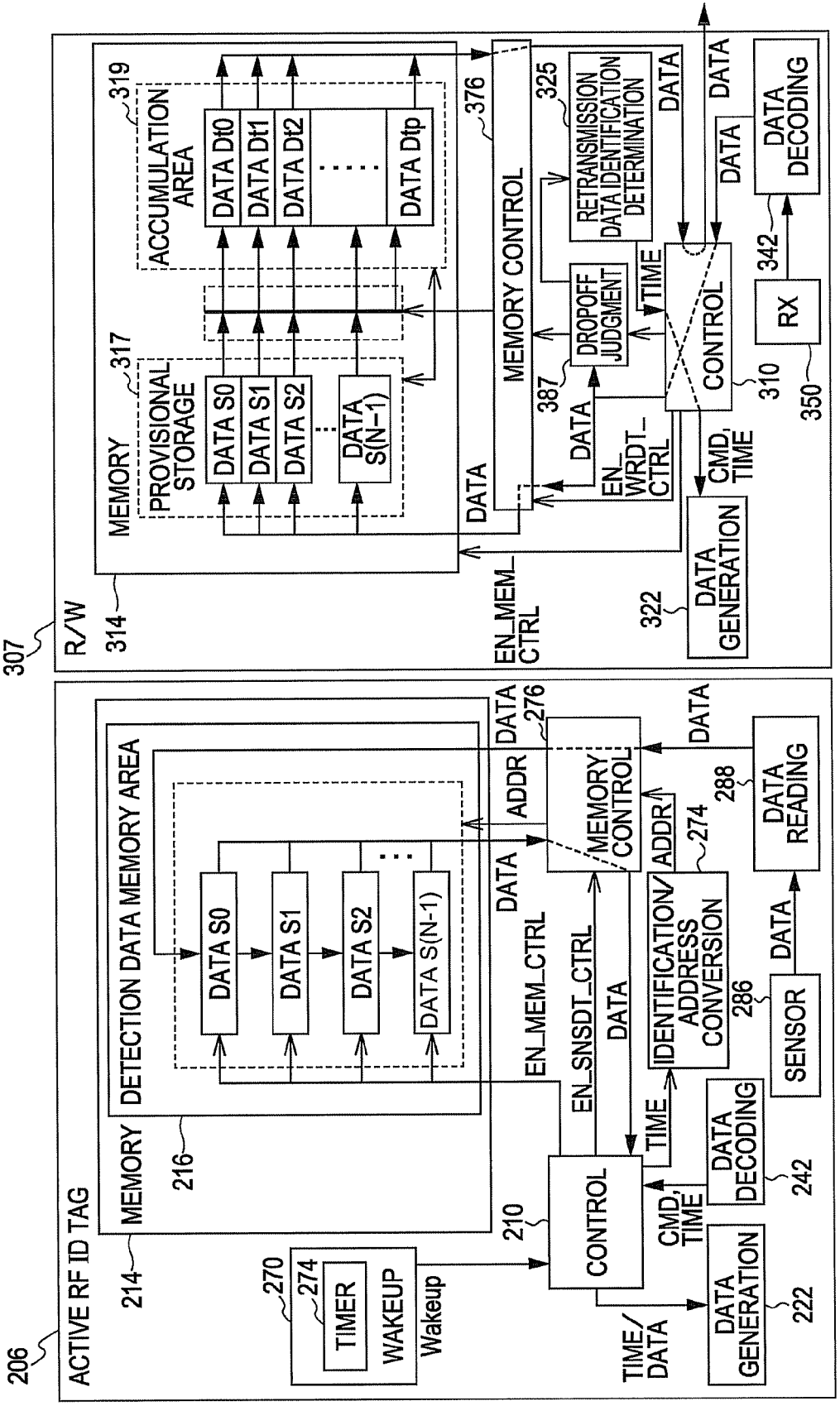
FIG. 19 illustrates an example of the configuration of only the related parts of the reader/writer and the active RF-ID tag as an active non-contact information storage unit according to a further embodiment of the invention.

FIG. 19 illustrates the configuration of only the related parts of the reader/writer 307 and the active RF-ID tag 207 as an active non-contact information storage unit according to a further embodiment of the invention.

Referring to the right side of FIG. 19, the reader/writer 307 has a retransmission data identification determining unit 325. The data drop-off judging unit 387 and the retransmission data identification determining unit 325 may be a part of the control unit 310. The data drop-off judging unit 387 judges which detection value data has dropped off, based on the date/hour or the sequence number of the received detection value data thereby to determine one of the identification, position (sequence number) and the time (date/hour) of the drop-off data. The retransmission data identification determining unit 325 receives one of the identification, position and time of the accumulative drop-off data from the data drop-off judging unit 387, and determines the identification, position or time, as the case may be, of the drop-off data to be retransmitted. The control unit 310 generates the detection data request command including the data identification, position or time of the data and supplies it to the data generating unit 322. The configuration of the other parts of the reader/writer 307 is similar to that of the reader/writer 306 illustrated in FIG. 16.

Referring to the left side of FIG. 19, the RF-ID tag 207 has an identification, position or time/address conversion unit 274 (hereinafter referred to simply as the identification/address conversion unit). The control unit 210 retrieves the identification, position or time of the detection value data to be transmitted, from the received command and supplies it to the identification/address conversion unit 274. The identification/address conversion unit 274 converts the identification, position or time into the corresponding address in the detection data memory area of the memory 214. The identification/address conversion unit 274 supplies the memory control unit 276 with the address of the latest detection value data and the address of the detection value data of which the retransmission is requested. The memory control unit 276, in accordance with the particular address, selects both the N latest data areas S0 in the provisional storage area 317 and the address of the data areas S1 to S(N−1) of which retransmission is requested. The configuration of the other parts of the RF-ID tag 207 is similar to that of the RF-ID tag 204 illustrated in FIG. 7 or the RF-ID tag 205 illustrated in FIG. 10.

FIG. 20A illustrates an example of the time chart for the transmission process 42 of the RF signal carrying the tag information request command (CMD) of the reader/writer 307. FIG. 20B illustrates an example of the time chart for the receiving process 48 of the RF signal and the reception waiting mode 46 of the reader/writer 307. FIG. 20C illustrates an example of the time chart for the transmission process 56 of the RF signal carrying the data including the carrier sense operation 53 of the active RF-ID tag 207, the detection of the physical quantity, the detection value data read operation 62 and the write operation 66 into the memory 214, the receiving process 54 of the RF signal, the read operation 65 of the accumulated detection value from the memory 214 and the tag information such as the tag ID and the response data.

Referring to FIG. 20A, the data generating unit 322 of the reader/writer 307 generates and encrypts the data including the detection value data read request command containing the identification, position or time of the drop-off data received from the control unit 310 and to be transmitted, encodes the encrypted data and thus generates the encoded encryption data. The other operation of the reader/writer 307 in FIG. 20A is similar to that of the reader/writer 304 illustrated in FIG. 8A.

Referring to FIG. 20C, the data decoding unit 242 of the RF-ID tag 207 retrieves, from the received command, one of the identification, a position and time of the detection value data to be transmitted. The data decoding unit 242 supplies it to the identification/address conversion unit 274. The identification/address conversion unit 274 in turn supplies the memory control unit 276 with the address of the latest detection value data and the address corresponding to one of the identification, the position and the time of the detection data memory area 216. The memory control unit 276 retrieves only the data areas S0 to S(N−1) of the particular address for transmission.

FIG. 20B is similar to FIG. 17B. The memory control unit 376 of the reader/writer 307 operates similarly to the case of FIG. 17B, and forms a series of coupled detection value data interpolated or compensated by interpolation of the drop-off data.

In the reader/writer 307, the receiving unit 250 and the data decoding unit 342 first receive and reproduce the detection value data Dt1 carried by the RF signal received from the RF-ID tag 207. The data drop-off judging unit 387 judges that there is no drop-off based on the date/hour t1 of the data Dt1. The retransmission data identification determining unit 325 judges that there is no retransmission data for lack of the data drop-off. The control unit 310 generates the detection value data request command not including the identification, position or time of the retransmission data and supplies it to the data generating unit 322. The reader/writer 307 transmits the RF signal carrying the normal detection data request command.

The RF-ID tag 207 transmits the response RF signal carrying one detection value data Dt2 in response to the reception of the command.

The receiving unit 250 and the data decoding unit 342 of the reader/writer 307 fail to receive the RF signal from the RF-ID tag 207 and reproduce the data. The data drop-off judging unit 387 judges that there is one drop-off data in the absence of reception of the data on the scheduled date/hour t2. The data drop-off judging unit 387 determines one of the identification, the position and time t2 of the drop-off detection value data. Accordingly, the retransmission data identification determining unit 325 determines the identification, position or time t2 of the detection value data to be retransmitted. The reader/writer 307 transmits the RF signal carrying the detection value data request command including the identification, position or time t2 of the detection value data to be retransmitted.

The RF-ID tag 207 transmits the response RF signal carrying the two detection value data Dt2 and Dt3 in response to the reception of the particular command.

The receiving unit 250 and the data decoding unit 342 of the reader/writer 307 fail to receive the RF signal from the RF-ID tag 207 and reproduce the data. The data drop-off judging unit 387 judges that there are two accumulative drop-off data in the absence of reception of the data on the scheduled date/hour t2 and t3, and determines the identification, position or time (t2, t3) of the drop-off detection value data. Accordingly, the retransmission data identification determining unit 325 determines one of the identification, the position and the time (t2, t3) of the detection value data to be retransmitted. The reader/writer 307 accordingly transmits the RF signal carrying the detection value data request command including one of the identification, the position and the time (t2, t3) of the detection value data to be retransmitted.

The RF-ID tag 207 transmits the response RF signal carrying the three detection value data Dt2, Dt3 and Dt4 in response to the reception of the particular command.

In the reader/writer 307, the receiving unit 250 and the data decoding unit 342 receives and reproduces the three detection value data Dt2 to Dt4 carried by the RF signal received from the RF-ID tag 207. The data drop-off judging unit 387 judges that there is no drop-off based on the time t4 of the data Dt4. The retransmission data identification determining unit 325 determines that there is no retransmission data for lack of the data drop-off. The control unit 310 generates the detection value data request command not including one of the identification, the position and the time of the retransmission data and supplies the data generating unit 322. The reader/writer 307 transmits the RF signal carrying the normal detection data request command.

The RF-ID tag 207 transmits the response RF signal carrying one detection value data Dt5 in response to the reception of the particular command.

The reader/writer 307 illustrated in FIG. 19 determines the number N of the detection value data to be transmitted, in accordance with the number of continuous drop-off data reflecting the environmental condition of electromagnetic wave propagation. Thus, in the adverse environmental condition of electromagnetic wave propagation in which the data drop-off actually occurs, the reader/writer 307 causes the RF-ID tag 207 to retransmit the drop-off detection value data so that the reader/writer 307 can compensate or interpolate the drop-off data. In the favorable environmental condition of electromagnetic wave propagation, therefore, the power consumption of the battery 290 of the RF-ID tag 207 can be reduced by shortening the length of the transmission data or the transmission time.

Figure 21A:
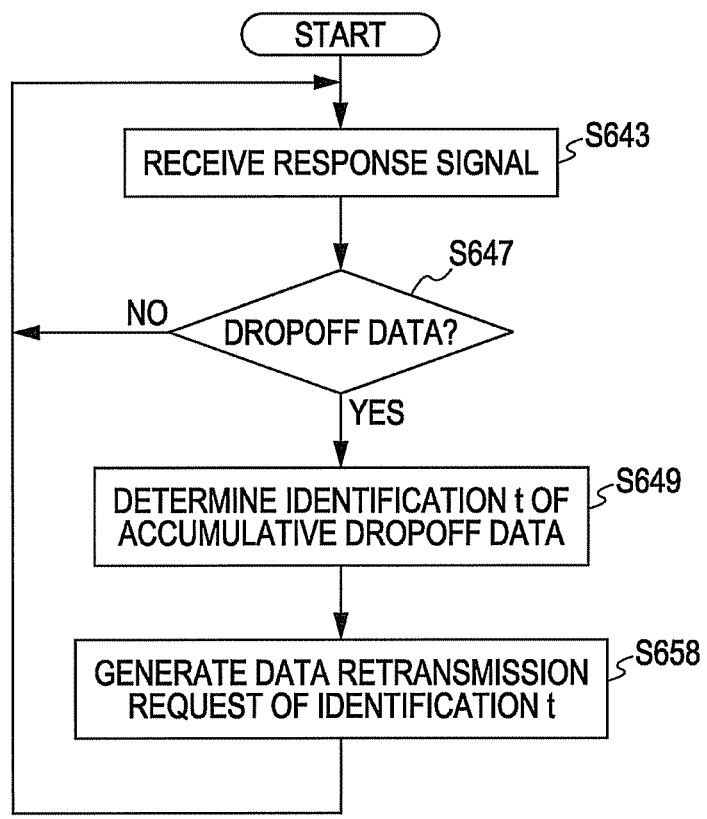
FIG. 21A illustrates an example of the operation flow executed by the reader/writer to determine the identification, position and time of the detection value data to be retransmitted in accordance with the drop-off data position.
Figure 21B:
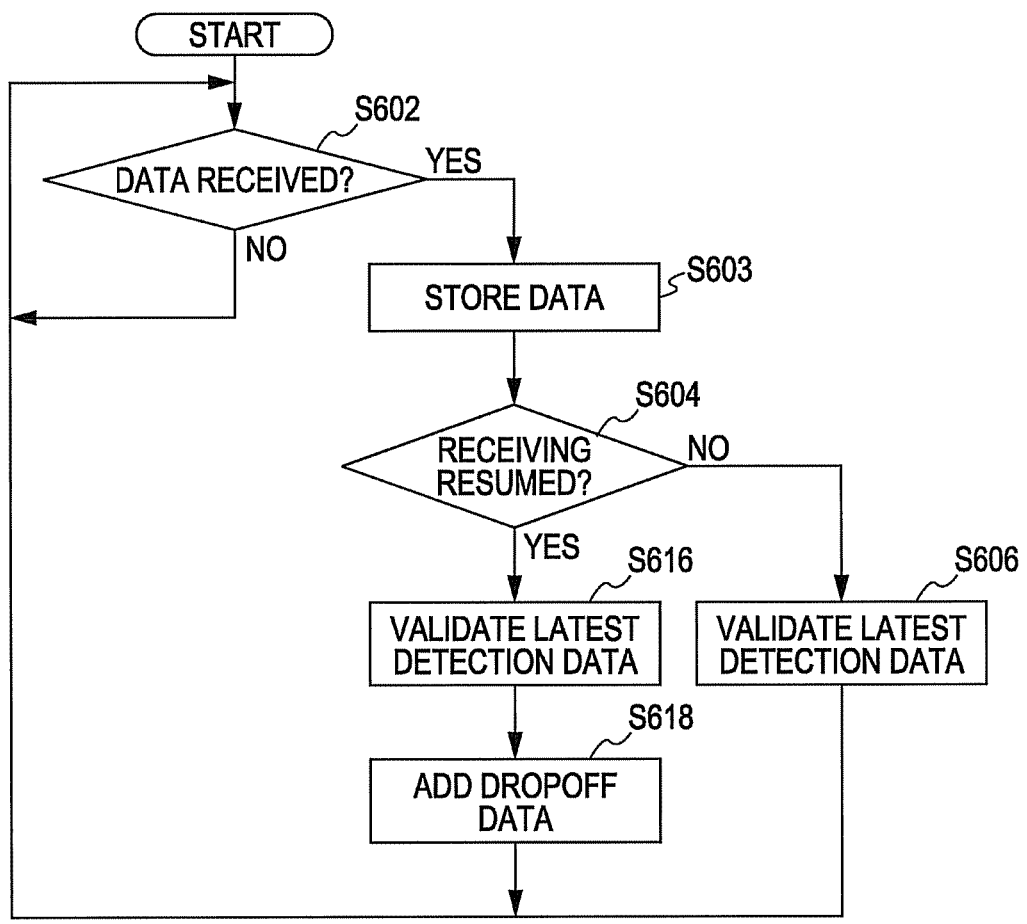
FIG. 21B illustrates an example of the operation flow of the process executed by the control unit and/or the memory control unit of the reader/writer to store a series of the received detection value data in the accumulation area of the memory.

FIG. 21A illustrates an example of the operation flow executed by the reader/writer 307 to determine the identification, position or time of the detection value data to be retransmitted, in accordance with the data drop-off position. FIG. 21B illustrates an example of the operation flow executed by the control unit 310 and/or the memory control unit 376 of the reader/writer 307 to store the received series of the detection value data Dt0 to Dtp in the accumulation area 319 of the memory 314.

Referring to FIG. 21A, the receiving unit 250 of the RF-ID tag 207 receives the RF signal in the operation S643. In the operation S647, the data drop-off judging unit 387 judges whether there is any drop-off data or not. In the absence of drop-off data, the process returns to the operation S643.

Upon judgment in the operation S647 that there is a drop-off data, the data drop-off judging unit 387 determines the identification, position or time of the accumulative drop-off data, and the retransmission data identification determining unit 325 determines them as the identification, the position or the time, as the case may be, of the accumulative drop-off data to be retransmitted. The control unit 310 generates the detection data request command including one of the particular identification, the position and the time. The control unit 310 supplies it to the data generating unit 322 in the operation S658. After that, the process returns to the operation S643.

The foregoing description of the invention concerns the RF-ID tag. Nevertheless, the invention is not limited to this, and it will be easily understood to those skilled in the art that this invention is also applicable to the non-contact IC card with equal effect.

The embodiments described above are only examples, and it is apparent to those skilled in the art that the invention can be modified or altered by combining the component elements of each embodiment. It will also be apparent to those skilled in the art that the embodiments described above can be variously modified without departing from the spirit and scope of the invention described in the appended claims.

What is claimed is:

1. An information access system comprising:
   an information device that is adapted for radio communication with a reader/writer, the information device including at least one processor that is configured to:
   periodically acquire detection data indicating a physical quantity or a state from a sensor detecting the physical quantity or the state;
   hold at least a predetermined number of the most recently acquired detection data acquired over a plurality of times;
   periodically detect reception of an RF signal transmitted from the reader/writer; and transmit a response signal carrying the predetermined number of the most recently acquired detection data in response to reception of an information request signal, wherein the reader/writer is adapted for radio communication with the information device, the reader/writer including at least one processor that is configured to:

repeatedly transmit the information request signal;

receive the response signal carrying the predetermined number of the detection data;

record the received detection data; and accumulate the most recently acquired detection data included in the predetermined number of received detection data, and when other detection data included in the predetermined number of the received detected data has not been accumulated, accumulate the other detection data.

2. An information device that is adapted for radio communication with a reader/writer, the information device comprising:

at least one processor configured to:

periodically acquire detection data indicating a physical quantity or a state from a sensor for detecting the physical quantity or the state;

hold at least a predetermined number of the most recently acquired detection data acquired over a plurality of times;

periodically detect an RF signal transmitted from the reader/writer;

transmit a response signal carrying the predetermined number of the most recently acquired detection data in response to reception of an information request signal; and determine the value of the predetermined number in accordance with a receiving power level of the information request signal.

3. A reader/writer that is adapted for radio communication with an information device, the reader/writer comprising:

at least one processor configured to:

repeatedly transmit an information request signal;

receive a response signal carrying a plurality of detection data indicating a physical quantity or a state from the information device;

record the received detection data; and accumulate the most recent detection data included in the plurality of the received detection data, and when other detection data included in the plurality of the received detection data has not been accumulated, accumulate the other detection data.

4. The reader/writer according to claim 3, wherein the at least one processor is further configured to:

determine the value of the number of the plurality of the detection data in accordance with the receiving power level of the response signal received, wherein the information request signal carries the value of the determined number.

5. The reader/writer according to claim 3, wherein the at least one processor is further configured to:

judge the presence or absence of drop-off of the plurality of the detection data received and determine the value of the number of the plurality of the detection data in accordance with the presence or absence of the drop-off of the detection data, wherein the information request signal carries the value of the determined number.

6. The reader/writer according to claim 3, wherein the at least one processor is further configured to:

judge the presence or absence of drop-off of the plurality of the detection data received and determine identification information of the drop-off detection data, wherein the information request signal carries the determined identification information.

7. A non-transitory computer-readable storage medium storing a computer program for causing a computer to function as an information device that is adapted for radio communication with a reader/writer, the computer program comprising the operations of:

periodically acquiring detection data indicating a physical quantity or a state from a sensor detecting the physical quantity or the state;

recording at least a predetermined number of the most recently acquired detection data acquired over a plurality of times;

periodically receiving an information request signal transmitted from the reader/writer;

transmitting the predetermined number of the most recently acquired detection data as a response signal to the reader/writer in response to the detection of the information request signal; and determining the value of the predetermined number in accordance with a receiving power level of the information request signal.

8. A non-transitory computer-readable storage medium storing a computer program for causing a computer to function as a reader/writer that is adapted for radio communication with an information device, the computer program comprising the operations of:

transmitting an information request signal repeatedly;

receiving a response signal carrying a plurality of detection data indicating a physical quantity or a state from the information device; and accumulating, in an accumulation recording unit, the most recent detection data included in the plurality of the received detection data, and when other detection data included in the plurality of the received detection data has not been accumulated in the accumulation area, accumulating the other detection data in the accumulation recording unit.

* * * * *